US011236652B2

(12) United States Patent
Kishikawa et al.

(10) Patent No.: US 11,236,652 B2
(45) Date of Patent: Feb. 1, 2022

(54) EXHAUST DEVICE FOR INTERNAL COMBUSTION ENGINE

(71) Applicant: HONDA MOTOR CO., LTD., Tokyo (JP)

(72) Inventors: Keisuke Kishikawa, Wako (JP); Yoji Fukui, Wako (JP); Kazuya Yoshio, Wako (JP); Takuya Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 644 days.

(21) Appl. No.: 16/085,264

(22) PCT Filed: Jan. 13, 2017

(86) PCT No.: PCT/JP2017/001128
§ 371 (c)(1),
(2) Date: Sep. 14, 2018

(87) PCT Pub. No.: WO2017/159019
PCT Pub. Date: Sep. 21, 2019

(65) Prior Publication Data
US 2019/0078476 A1 Mar. 14, 2019

(30) Foreign Application Priority Data

Mar. 17, 2016 (JP) .............................. JP2016-054542

(51) Int. Cl.
*F01N 1/16* (2006.01)
*F01N 1/06* (2006.01)
(Continued)

(52) U.S. Cl.
CPC ............. *F01N 1/006* (2013.01); *F01N 1/026* (2013.01); *F01N 1/06* (2013.01); *F01N 1/08* (2013.01);
(Continued)

(58) Field of Classification Search
CPC . F01N 1/06; F01N 1/163; F01N 1/165; F01N 1/166; F01N 2470/02;
(Continued)

(56) References Cited

U.S. PATENT DOCUMENTS 1,781,001 A 11/1930 Eisele
2,404,589 A 7/1946 Monaghan
(Continued)

FOREIGN PATENT DOCUMENTS

DE 19605540 A1 8/1997
DE 10231056 A1 2/2004
(Continued)

OTHER PUBLICATIONS

Extended European Search Report, dated Mar. 13, 2 019, for European Application No. 17766027.1.
(Continued)

*Primary Examiner* — Jeremy A Luks
(74) *Attorney, Agent, or Firm* — Birch, Stewart, Kolasch & Birch, LLP

(57) ABSTRACT

An exhaust muffler is made up of a plurality of layers including an exhaust passage pipe and expansion chambers, and includes a front assembly and a rear assembly sub-assembled separately from the front assembly. The front assembly includes a front exhaust passage pipe, a front muffler body disposed in covering relation to the outside of the front exhaust passage pipe and cooperating with the front exhaust passage pipe in making up double-walled pipes, and an exhaust valve disposed in the front exhaust passage pipe. The rear assembly includes a rear exhaust passage pipe and a rear muffler body disposed in covering relation to the outside of the rear exhaust passage pipe and cooperating with the rear exhaust passage pipe in making up double-walled pipes. There is thus provided an exhaust device for an (Continued)

internal combustion engine in which the accuracy of a position where the exhaust valve is installed is high.

19 Claims, 17 Drawing Sheets

(51) Int. Cl.
| | |
|---|---|
| *F01N 1/00* | (2006.01) |
| *F01N 1/08* | (2006.01) |
| *F01N 13/02* | (2010.01) |
| *F01N 1/18* | (2006.01) |
| *F01N 13/00* | (2010.01) |
| *F01N 13/14* | (2010.01) |
| *F01N 1/02* | (2006.01) |
| *F01N 3/28* | (2006.01) |
| *F01N 13/08* | (2010.01) |
| *B62K 11/04* | (2006.01) |

(52) U.S. Cl.
CPC ............ *F01N 1/089* (2013.01); *F01N 1/163* (2013.01); *F01N 1/165* (2013.01); *F01N 1/166* (2013.01); *F01N 1/18* (2013.01); *F01N 3/2882* (2013.01); *F01N 13/007* (2013.01); *F01N 13/02* (2013.01); *F01N 13/082* (2013.01); *F01N 13/141* (2013.01); *B62K 11/04* (2013.01); *F01N 2230/04* (2013.01); *F01N 2240/20* (2013.01); *F01N 2240/36* (2013.01); *F01N 2340/02* (2013.01); *F01N 2340/04* (2013.01); *F01N 2470/02* (2013.01); *F01N 2470/08* (2013.01); *F01N 2470/10* (2013.01); *F01N 2470/20* (2013.01); *F01N 2470/24* (2013.01); *F01N 2490/04* (2013.01); *F01N 2490/08* (2013.01); *F01N 2490/155* (2013.01); *F01N 2490/18* (2013.01); *F01N 2590/04* (2013.01)

(58) Field of Classification Search
CPC ............. F01N 2470/08; F01N 2470/10; F01N 2490/02; F01N 2490/04
See application file for complete search history.

(56) References Cited

U.S. PATENT DOCUMENTS

| | | | |
|---|---|---|---|
| 3,703,937 A | 11/1972 | Tenney | |
| 7,779,963 B2 * | 8/2010 | Muto | ............... F01N 1/003 181/252 |
| 2002/0033302 A1 | 3/2002 | Kaneko et al. | |
| 2004/0006970 A1 | 1/2004 | Worner et al. | |
| 2006/0000205 A1 | 1/2006 | Bozmoski et al. | |
| 2006/0162995 A1 | 7/2006 | Schorn et al. | |
| 2008/0116004 A1 * | 5/2008 | Muto | ............... F01N 1/003 181/228 |
| 2014/0060963 A1 | 3/2014 | Ono et al. | |

FOREIGN PATENT DOCUMENTS

| | | |
|---|---|---|
| DE | 102005003582 A1 | 8/2006 |
| EP | 1921285 A1 | 5/2008 |
| JP | 55-137309 A | 10/1980 |
| JP | 2002-070523 A | 3/2002 |
| JP | 2006-017124 A | 1/2006 |
| JP | 2014-047762 A | 3/2014 |

OTHER PUBLICATIONS

International Search Report (PCT/ISA/210) issued in PCT/JP2017/001128, dated Mar. 21, 2017.

* cited by examiner

EXHAUST DEVICE FOR INTERNAL COMBUSTION ENGINE

TECHNICAL FIELD

The present invention relates to an exhaust device for an internal combustion engine, in which an exhaust valve is provided in an exhaust passage pipe disposed in an exhaust muffler, for opening and closing the exhaust passage pipe to switch between flow passageways for exhaust gases such that when the exhaust valve closes the exhaust passage pipe, one of the flow passageways that is positioned upstream of the exhaust valve is selected for the exhaust gases to flow therethrough.

BACKGROUND ART

Heretofore, there has been an exhaust device for an internal combustion engine, in which an exhaust valve is provided in an exhaust pipe extending through an exhaust muffler (see PATENT DOCUMENT 1). In such an exhaust device for an internal combustion engine, an exhaust valve is provided within an exhaust passage pipe in the vicinity of the center of the exhaust passage pipe that is integrally disposed in and extends through an exhaust muffler. For manufacturing the exhaust device, it is necessary to prepare the exhaust passage pipe with the exhaust valve pre-assembled therein as a sub-assembly and assemble the exhaust muffler in covering relation to the sub-assembly. If the exhaust passage pipe is long in size, then it is difficult to increase the accuracy of a position where the exhaust valve is installed in the exhaust passage pipe.

PRIOR ART DOCUMENT

Patent Document

[Patent Document 1]
JP 2006-017124 A

SUMMARY OF THE INVENTION

Underlying Problem to be Solved by the Invention

An exhaust device for an internal combustion engine according to the present invention has been devised in order to overcome the above difficulties. It is an object of the present invention to provide an exhaust device for an internal combustion engine, which includes an exhaust muffler with an exhaust valve provided in an exhaust passage pipe that is integrally disposed in and extends through the exhaust muffler, where the accuracy of a position where the exhaust valve is installed is high.

Means to Solve the Underlying Problem

According to the invention, there is provided an exhaust device for an internal combustion engine, including an exhaust pipe and an exhaust muffler connected to a downstream end of the exhaust pipe, the exhaust muffler extending from a portion thereof connected to the exhaust pipe rearward on a vehicle on which the exhaust muffler is installed, the exhaust device including: a plurality of expansion chambers defined in the exhaust muffler; an exhaust passage pipe extending through the expansion chambers for allowing exhaust gases from the exhaust pipe to flow therethrough; and an exhaust valve provided in the exhaust passage pipe for opening and closing the exhaust passage pipe to switch between flow passageways for exhaust gases,
wherein the exhaust muffler is made up of a plurality of layers including the exhaust passage pipe and the expansion chambers provided around an outer periphery of the exhaust passage pipe;
the exhaust muffler includes a front assembly connected to the exhaust pipe and a rear assembly connected to a rear portion of the front assembly and sub-assembled separately from the front assembly;
the exhaust passage pipe includes a front exhaust passage pipe as part of the front assembly, with the exhaust valve being disposed in the front exhaust passage pipe, and a rear exhaust passage pipe as part of the rear assembly;
the front assembly includes the front exhaust passage pipe 41, a front muffler body disposed in covering relation to an outside of the front exhaust passage pipe to cooperate with the front exhaust passage pipe in making up double-walled pipes, and the exhaust valve; and
the rear assembly includes the rear exhaust passage pipe and a rear muffler body disposed in covering relation to an outside of the rear exhaust passage pipe to cooperate with the rear exhaust passage pipe in making up double-walled pipes.

With the above arrangement, the exhaust muffler is made up of a plurality of layers including the exhaust passage pipe and the expansion chambers around the outer periphery of the exhaust passage pipe. Of the exhaust muffler, the front assembly connected to the exhaust pipe serves as a single assembly including the front exhaust passage pipe and the front muffler body that make up double-walled pipes, with the exhaust valve disposed in the front exhaust pipe, and the rear assembly as another assembly. After the front assembly and the rear assembly have been sub-assembled separately, the front assembly and the rear assembly are integrally assembled together into the exhaust device, providing the exhaust device. There is thus provided an exhaust device in which the accuracy of a position where the exhaust valve is installed is high.

In the above arrangement, the front muffler body may be of a circular cross-sectional shape and the rear muffler body may be of a non-circular cross-sectional shape; and a valve actuator coupled to the exhaust valve for opening and closing the exhaust valve may be disposed on an outside of the front muffler body.

With the above arrangement, in a case where the exhaust muffler includes the front muffler body and the rear muffler body that have different cross-sectional shapes, the exhaust valve is disposed in the front assembly that incorporates the front muffler body shaped to a circular cross section, and the valve actuator for opening and closing the exhaust valve is provided on the outer side of the front muffler body. With this arrangement, the layout freedom of the exhaust valve in the circumferential directions of the exhaust muffler can be further increased.

In the above arrangement, one of the expansion chambers may be provided between the front exhaust passage pipe and the front muffler body; others of the expansion chambers may be provided between the rear exhaust passage pipe and the rear muffler body; the front muffler body may have an outside diameter smaller than an outside diameter of the rear muffler body and may have a constricted shape; and the front exhaust passage pipe and the rear exhaust passage pipe may be generally of the same diameter as each other.

With the above arrangement, the front exhaust passage pipe of the exhaust muffler is generally of the same diameter as the rear exhaust passage pipe, and the outside diameter of the first expansion chamber around the outer periphery of the front exhaust passage pipe is smaller than the outside diameter of the expansion chambers in the rear exhaust muffler. Therefore, the length of the exhaust valve shaft that connects the exhaust valve and the valve actuator to each other is reduced, minimizing twisting of the exhaust valve shaft to minimize an operational delay of the exhaust valve.

In the above arrangement, the exhaust muffler may have a front end connected to the downstream end of the exhaust pipe; the exhaust passage pipe may have an upstream end positioned upstream of the exhaust valve and connected to the exhaust pipe in the exhaust muffler; and the exhaust passage pipe may have fluid communication holes defined therein between an area where the upstream end of the exhaust muffler is connected and an area where the exhaust valve is provided, the through holes being held in fluid communication with the expansion chamber.

With the above arrangement, where the front end of the exhaust muffler is connected to the exhaust pipe, the upstream end of the exhaust passage pipe is connected to the downstream end of the exhaust pipe, and the exhaust passage pipe is held in fluid communication with the expansion chamber through the through holes on the upstream side of the exhaust valve. Consequently, when the exhaust valve is closed, exhaust gases are caused to flow into the expansion chamber by a simple structure.

In the above arrangement, the exhaust muffler may have a front end connected to the downstream end of the exhaust pipe; the exhaust passage pipe may have an upstream end positioned upstream of the exhaust valve and spaced an interval from the exhaust pipe in the exhaust muffler; and the exhaust pipe may be held in fluid communication with the expansion chamber through a gap between the exhaust pipe and the upstream end of the exhaust passage pipe.

With the above arrangement, where the upstream end of the exhaust muffler is connected to the exhaust pipe, the front end of the exhaust passage pipe is spaced from the downstream end of the exhaust pipe. When the exhaust valve is closed, exhaust gases from the exhaust pipe is caused to flow into the expansion chamber through the gap between the exhaust pipe and the exhaust passage pipe. The junction between the exhaust pipe and the exhaust passage pipe is thus reduced, providing a simpler structure.

In the above arrangement, at least either upstream portions or downstream portions of the front muffler body and the front exhaust passage pipe may be integrally connected to each other respectively by annular plate members; and the annular plate members may have fluid communication holes defined therein through which exhaust gases flow.

With the above arrangement, the portion of the front exhaust passage pipe where the exhaust valve is disposed is covered with the front muffler body having inner and outer double-walled pipes, and the upstream and downstream ends of the double-walled tubular members are connected by the annular plate members. The space of the expansion chamber can thus simply be created using the annular plate members, and the plural members can easily be integrated.

In the above arrangement, the communication holes defined in the annular plate members may be provided as a plurality of fluid communication holes spaced at circumferential intervals.

With the above arrangement, as the fluid communication holes in the annular members are disposed at circumferentially spaced intervals, exhaust gases that are flowing in is diffused in outer circumferential directions through the fluid communication holes for a balanced flow of exhaust gases.

In the above arrangement, the fluid communication holes defined in the annular plate members may be provided such that the number of the fluid communication holes defined in the annular plate member disposed on an upstream side may be larger than the number of the fluid communication holes defined in the annular plate member disposed on a downstream side.

With the above arrangement, the larger number of the fluid communication holes on the upstream side promotes diffusion of exhaust gases, and the smaller number of the fluid communication holes on the downstream side permits each of the fluid communication holes to be increased in size, thereby making it easy to discharge exhaust gases from the front assembly and hence to prevent exhaust gases from staying stagnant in the front assembly.

In the above arrangement, the exhaust pipe may have a downstream end fitted over or in and held by a front end of the exhaust passage pipe, and only the annular plate member may be disposed downstream of the exhaust valve.

With the above arrangement, inasmuch as the downstream end of the exhaust pipe is fitted in or over and held by the front end of the exhaust passage pipe, one of the annular plate members can be dispensed with, and the cross-sectional area of the flow passageway for exhaust gases is maximized, so that the resistance to a flow of exhaust gases is reduced and the number of parts used is reduced for a cost reduction.

In the above arrangement, the annular plate member may include radial extensions separating adjacent ones of the fluid communication holes and disposed radially; and one of the radial extensions may be positioned in overlapping relation to an exhaust valve shaft of the exhaust valve in the direction of a flow passage.

With the above arrangement, one of the radial extensions is positioned in overlapping relation to the exhaust valve shaft. Consequently, the resistance of the flow passage is prevented from increasing without an increase in the areas of closures provided by the valve shaft and the radial pieces.

In the above arrangement, the exhaust muffler may include an exhaust device mount member by which the exhaust device is mounted on the vehicle; the exhaust device mount member may include a front mount and a rear mount that are fixed respectively to the front muffler body and the rear muffler body, a front mount piece extending from the front mount upwardly of the front muffler body, and a rear mount piece extending from the rear mount and joining the rear mount to an upper end of the front mount piece; and a vehicle mount to be mounted on the vehicle may be provided on a junction between the front mount piece and the rear mount piece.

With the above arrangement, the exhaust muffler is suspended by the front mount and the rear mount of the exhaust device mount member, the front mount piece and the rear mount piece extending respectively from the front mount and the rear mount, and the vehicle mount provided on the junction between the front mount piece and the rear mount piece that are arranged in a triangular layout, and hence the rigidity with which the exhaust muffler is suspended is increased.

Advantageous Effect of the Invention

An exhaust device for an internal combustion engine according to the present invention includes an exhaust muffler incorporating an exhaust valve therein and disposed in the vicinity of the center of an exhaust passage pipe that is disposed integrally with and extending through the exhaust muffler, the exhaust muffler including a front assembly connected to an exhaust pipe and serving as a single assembly that includes a front exhaust passage pipe and a front muffler body that make up double-walled pipes, and a rear assembly as another assembly, the exhaust valve being disposed in the front assembly. Therefore, the accuracy of a position where the exhaust valve is installed is high.

DESCRIPTION OF EMBODIMENTS OF THE INVENTION

An exhaust device 20 for an internal combustion engine according to a first embodiment of the present invention for use on a saddle-type vehicle will be described below with reference to FIGS. 1 through 14.

Figure 1:
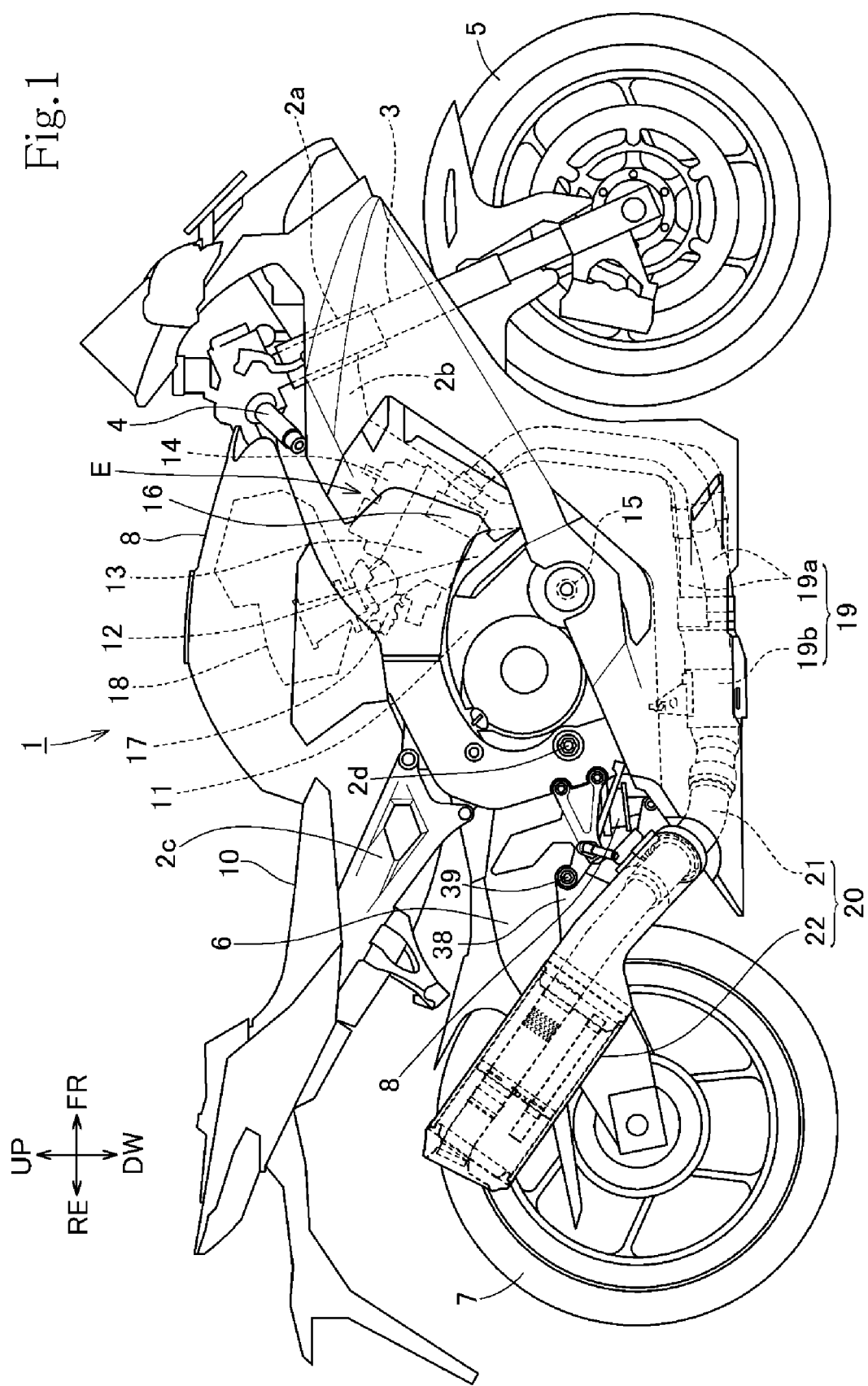
FIG. 1 is a right-hand side elevational view of a two-wheel motorcycle incorporating an exhaust device for an internal combustion engine according to a first embodiment of the present invention.

FIG. 1 is a right-hand side elevational view of a two-wheel motorcycle 1 as an example of a saddle-type vehicle incorporating the exhaust device 20 according to the present embodiment. In the present description, forward, rearward, leftward, and rightward directions are defined with respect to the posture of the motorcycle 1 that is oriented in a forward direction along which the motorcycle 1 moves ahead.

The two-wheel motorcycle 1 includes a vehicle body frame 2 constructed as follows. A pair of left and right main frames 2b fixed to a head pipe 2a extends rearward on a central line of the vehicle body and is bent downward in surrounding relation relative to a cylinder head 13 of an internal combustion engine E of the motorcycle 1. Seat rails 2c are mounted on upper rear portions of the main frames 2b and extend rearward while spreading to the left and right.

In the vehicle body frame 2, a front fork 3 is pivotally supported on the head pipe 2a, and a handle 4 extending to the left and right is mounted on an upper end of the front fork 3. A front wheel 5 is rotatably supported on a lower end of the front fork 3. A swing arm 6 has a front end pivotally supported by a swing arm pivot 2d mounted on lower portions of the main frames 2b and extends rearward, and a rear wheel 7 is rotatably supported on a rear end of the swing arm 6. A rear cushion 8 is interposed between the swing arm 6 and a lower portion of the vehicle body frame 2. A fuel tank 9 is mounted on the main frames 2b and the seat rails 2c, and a rider's seat 10 is supported on the seat rails 2c behind the fuel tank 9.

The internal combustion engine E supported on the vehicle body frame 2 includes an in-line four-cylinder, four-stroke internal combustion engine, for example, and includes a cylinder block 12 and the cylinder head 13 that are stacked successively on a crankcase 11 and fastened integrally together by bolts (not depicted), with the cylinder head 13 being covered with a cylinder head cover 14 disposed on its upper portion. The internal combustion engine E has a crankshaft 15 oriented in the widthwise directions of the vehicle body, is surrounded by the vehicle body frame 2, and has cylinders 16 slightly inclined forwardly.

To the cylinders 16 of the internal combustion engine E, there are connected an intake manifold (not depicted) having a fuel injection valve (not depicted), a throttle body 17, a connecting tube (not depicted), and an air cleaner 18 arranged in succession. Ambient air that is drawn in from the air cleaner 18 is mixed with a fuel injected from the fuel injection valve, producing an air-fuel mixture that is delivered to the cylinders 16 in which the air-fuel mixture is burned.

An exhaust manifold 19 is connected to the cylinders 16 of the internal combustion engine E. The exhaust manifold 19 includes header pipes 19a connected to the respective cylinders 16, extending downward, and then bent rearward, and a collecting pipe 19b connected to rear ends of the header pipes 19a. The collecting pipe 19b has a rear end connected to the exhaust device 20. Exhaust gases discharged from the cylinders 16 of the internal combustion engine E are delivered from the exhaust manifold 19 to the exhaust device 20, from which the exhaust gases are discharged into the atmosphere. The exhaust device 20 includes an exhaust device mount member 38 by which the exhaust device 20 is mounted on the vehicle body frame 2 in a manner to extend obliquely rearward and upward at a position on the right-hand side of the motorcycle 1.

Figure 2:
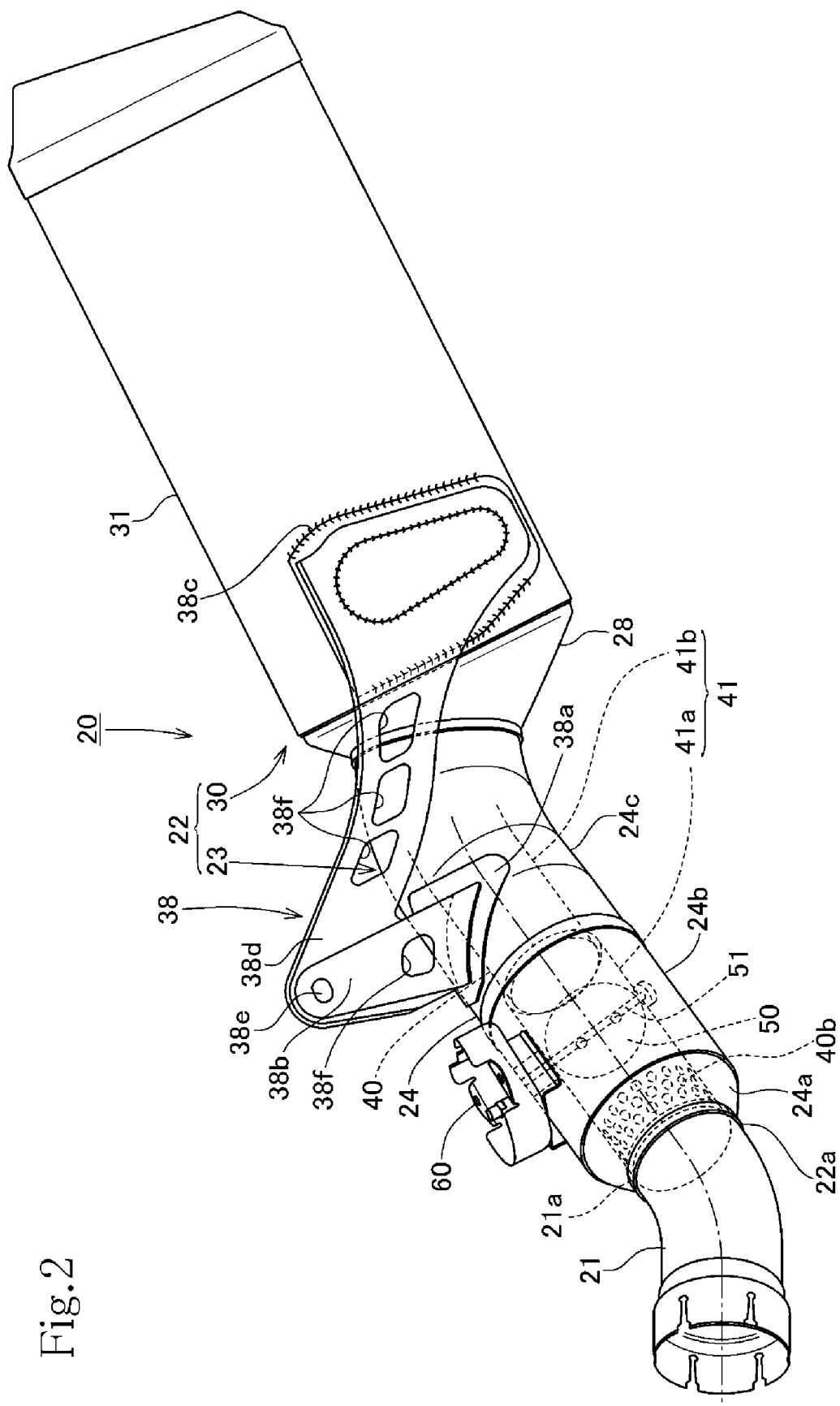
FIG. 2 is a perspective view of the exhaust device.

As shown in FIG. 2, the exhaust device mount member 38 includes a front mount 38a and a rear mount 38c that are fixed respectively to a front muffler body 24 and a rear muffler body 31, to be described later, a front mount piece 38b extending from the front mount 38a upward of the front muffler body 24, and a rear mount piece 38d extending from the rear mount 38c and joining the rear mount 38c to an upper end of the front mount piece 38b. A mount boss 38e as a vehicle mount to be mounted on the motorcycle 1 is provided on the junction between the front mount piece 38b and the rear mount piece 38d. The exhaust device mount member 38 also has through holes 38f, one in the front mount piece 38b and three in the rear mount piece 38d, for making itself lightweight. As depicted in FIG. 1, a mounting bolt 39 is inserted through the mount boss 38e of the exhaust device mount member 38 and fastened to the motorcycle 1, thereby mounting the exhaust device 20 to the motorcycle 1.

Figure 3:
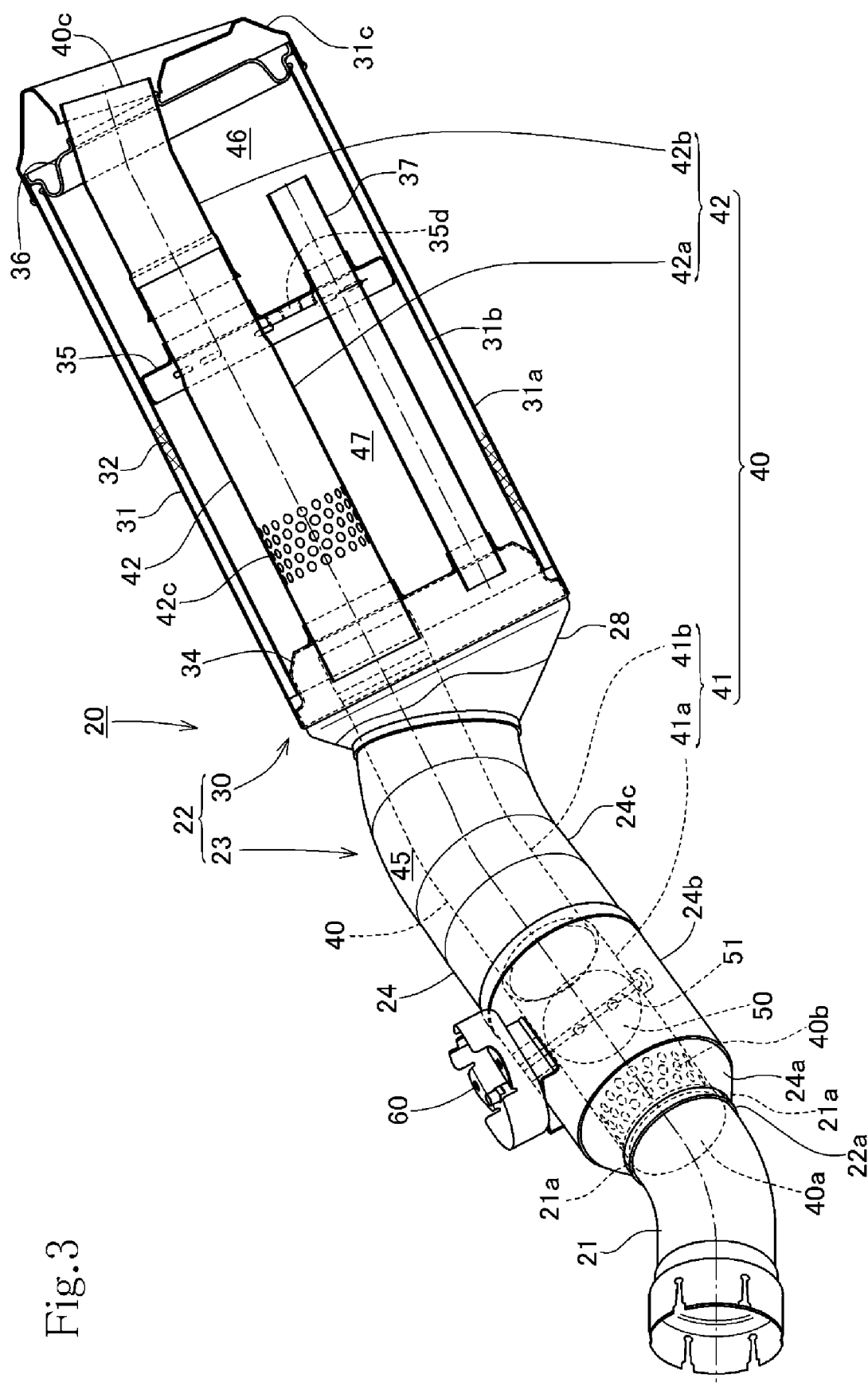
FIG. 3 is a perspective view, partly cut away, of the exhaust device with an exhaust device mount member detached.
Figure 4:
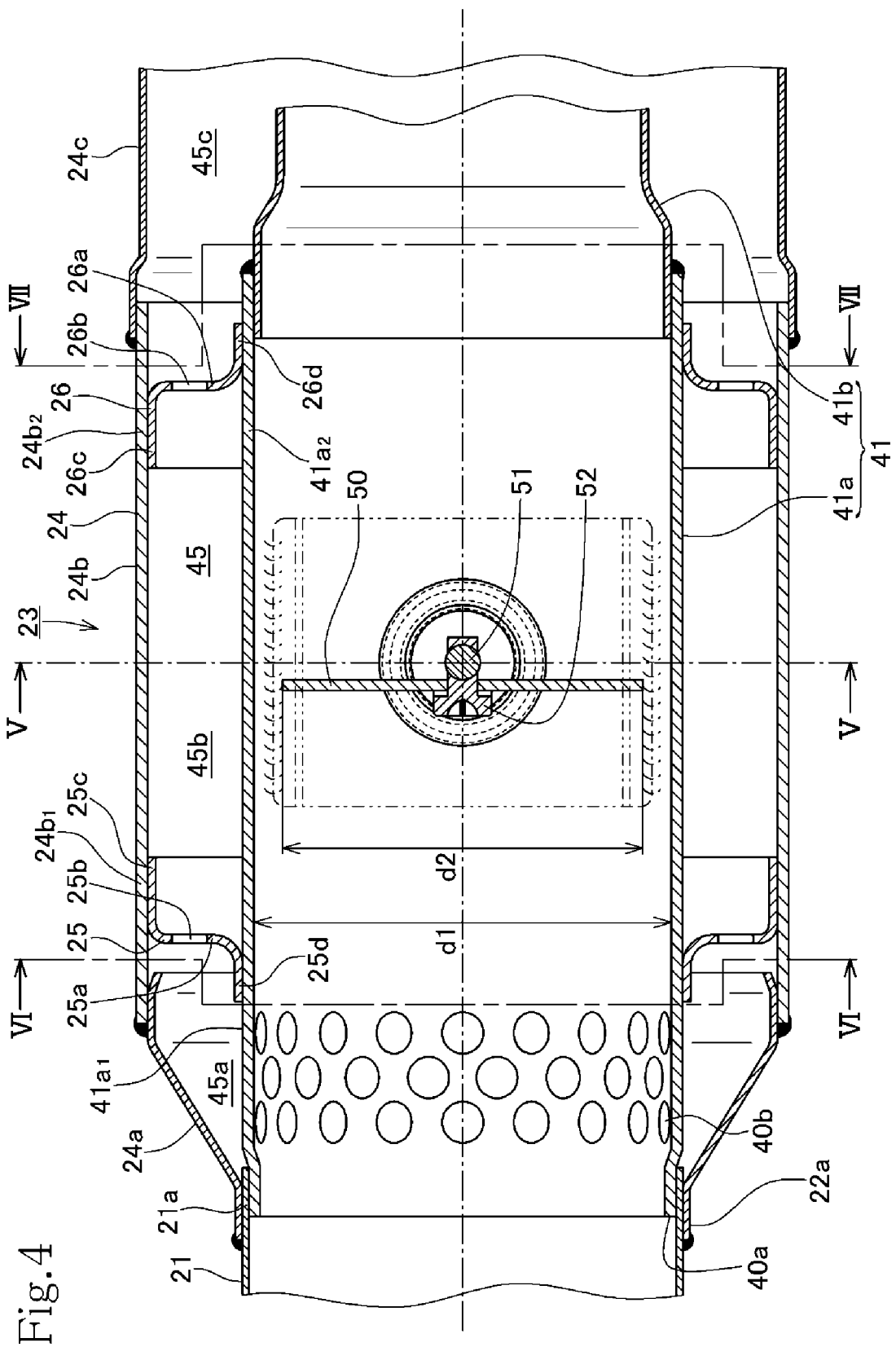
FIG. 4 is a fragmentary horizontal sectional view of a front assembly.

As depicted in FIGS. 1 and 2, the exhaust device 20 includes an exhaust pipe 21 connected to a rear end of the collecting pipe 19b of the exhaust manifold 19 for receiving burned exhaust gases from the internal combustion engine E, and an exhaust muffler 22 for silencing exhaust gases delivered from the exhaust pipe 21. As illustrated in FIGS. 2 through 4, the exhaust pipe 21 has a downstream end 21a connected to a front end 22a of the exhaust muffler 22. As depicted in FIG. 1, the exhaust muffler 22 is in an attitude extending obliquely rearward and upward with respect to the motorcycle 1 on which the exhaust muffler 22 is mounted.

As depicted in FIG. 3, the exhaust muffler 22 has its interior divided by a first partition wall 34 and a second partition wall 35 into a first expansion chamber 45, a third expansion chamber 47, and a second expansion chamber 46 that are arranged successively from the front. To the downstream end 21a of the exhaust pipe 21, there is connected an exhaust passage pipe 40 through which exhaust gases from the exhaust pipe 21 flow. The exhaust passage pipe 40 is of a hollow cylindrical shape extending through the expansion chambers 45, 46, and 47 in the exhaust muffler 22 to a rear end of the exhaust device 20, and has a diameter that remains essentially the same from its front end to rear end. The exhaust muffler 22 is thus made up of a plurality of layers as the exhaust passage pipe 40 and the expansion chambers 45, 46, and 47 provided around the outer periphery of the exhaust passage pipe 40. Furthermore, in the exhaust passage pipe 40 is disposed an exhaust valve 50 for switching between flow passageways for exhaust gases by opening and closing the exhaust passage pipe 40.

As shown in FIG. 2, the exhaust muffler 22 includes a front assembly 23 positioned forward and connected to the exhaust pipe 21 and a rear assembly 30 connected to a rear portion of the front assembly 23. The rear assembly 30 is sub-assembled separately from the front assembly 23, and then assembled integrally with the front assembly 23.

As depicted in FIG. 3, the exhaust passage pipe 40 includes a front exhaust passage pipe 41 as part of the front assembly 23 and a rear exhaust passage pipe 42 as part of the rear assembly 30. The front exhaust passage pipe 41 includes a first exhaust passage pipe 41a positioned forward and a second exhaust passage pipe 41b positioned rearward. The rear exhaust passage pipe 42 includes a third exhaust passage pipe 42a positioned forward and a fourth exhaust passage pipe 42b positioned rearward. The exhaust valve 50 is provided in the first exhaust passage pipe 41a of the front exhaust passage pipe 41.

As shown in FIGS. 3 and 4, the front assembly 23 includes the front exhaust passage pipe 41 and the front muffler body 24 disposed in covering relation to the outside of the front exhaust passage pipe 41 and cooperating with the front exhaust passage pipe 41 in making up double-walled pipes. The front exhaust passage pipe 41 is made up of the first exhaust passage pipe 41a and the second exhaust passage pipe 41b. The front assembly 23 further includes a first annular plate member 25 fixed to an upstream portion $41a_1$ of the first exhaust passage pipe 41a and an upstream portion $24b_1$ of the front muffler body 24 and closing the gap between the upstream portion $41a_1$ and the upstream portion $24b_1$, a second annular plate member 26 fixed to a downstream portion $41a_2$ of the first exhaust passage pipe 41a and a downstream portion $24b_2$ of the front muffler body 24 and closing the gap between the downstream portion $41a_2$ and the downstream portion $24b_2$, and the exhaust valve 50 disposed in the first exhaust passage pipe 41a for opening and closing the first exhaust passage pipe 41a.

As depicted in FIG. 3, the rear assembly 30 includes the rear exhaust passage pipe 42, the rear muffler body 31 disposed in covering relation to the outside of the rear exhaust passage pipe 42 and cooperating with the rear exhaust passage pipe 42 in making up double-walled pipes, the first partition wall 34 and the second partition wall 35 that divide the interior of the rear muffler body 31, and a fluid communication pipe 37 that provides fluid communication between the first expansion chamber 45 and the second expansion chamber 46.

Figure 5:
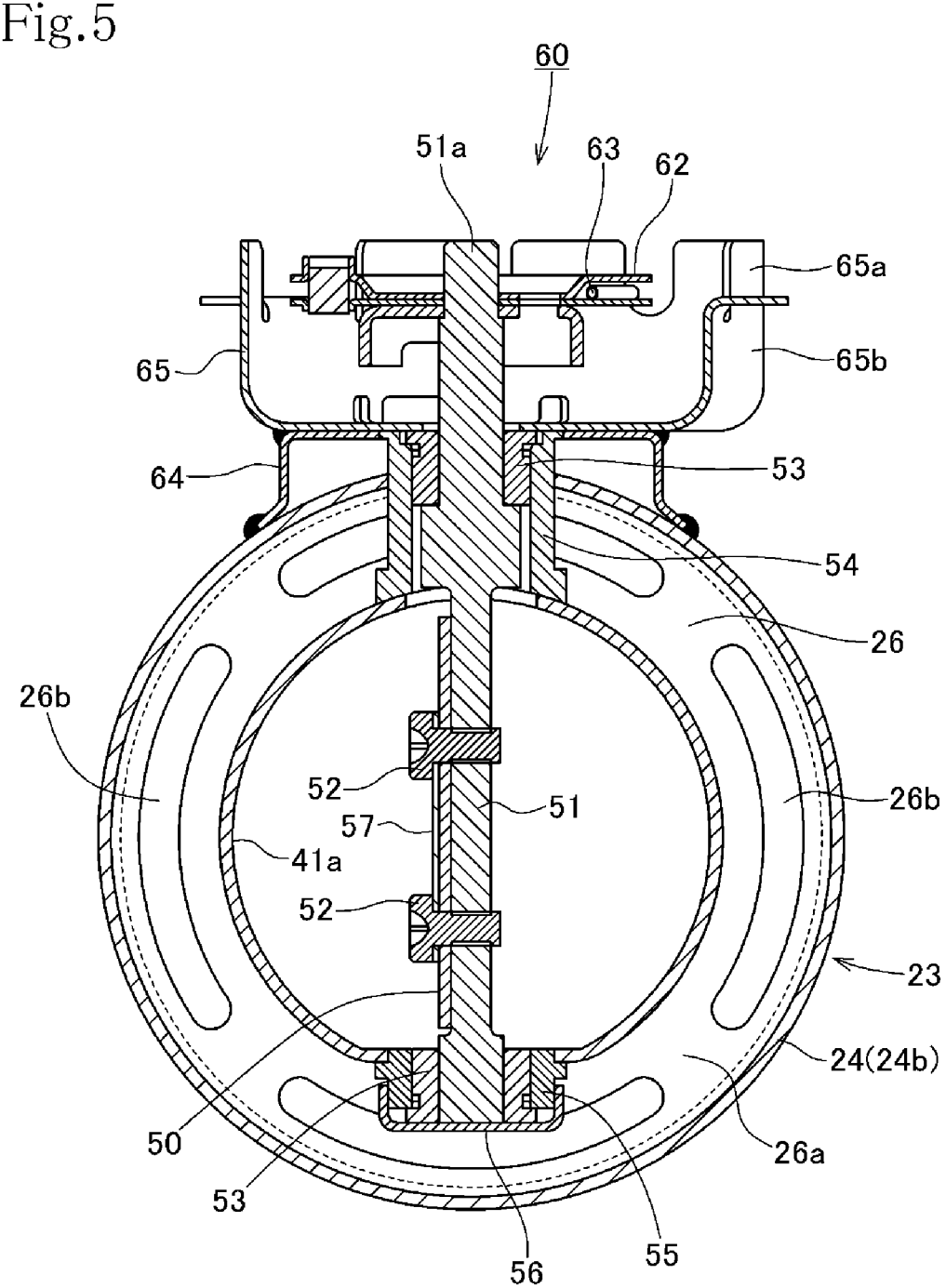
FIG. 5 is a cross-sectional view of the front assembly taken along line V-V of FIG. 4, depicting an exhaust valve in an open state with a valve actuator in an upper position.
Figure 11:
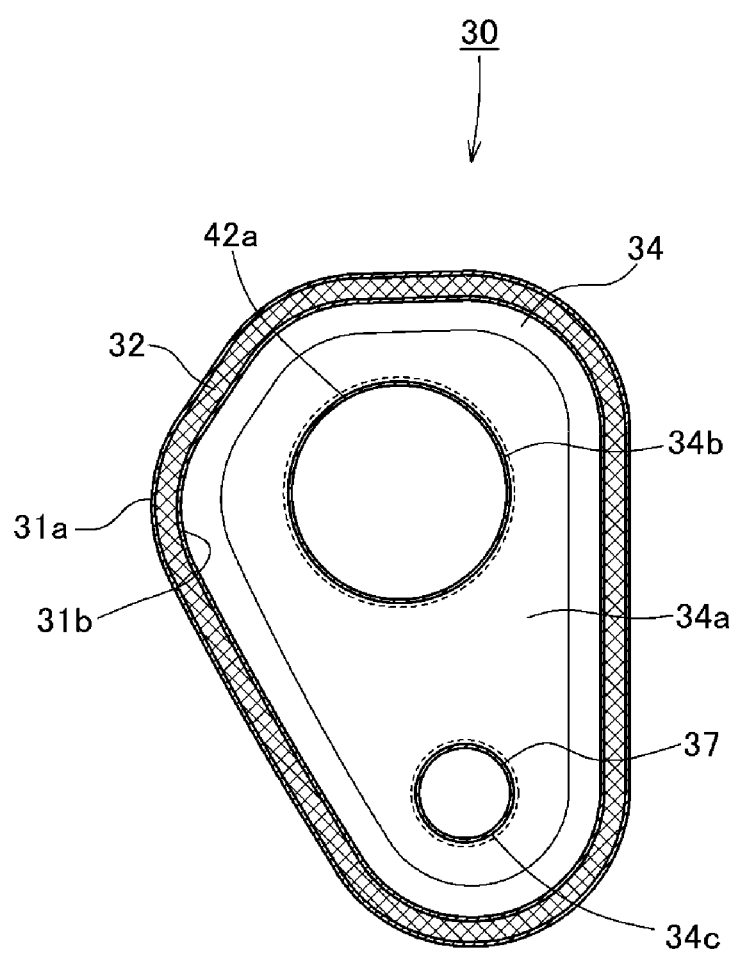
FIG. 11 is a cross-sectional view taken along line XI-XI of FIG. 9.
Figure 12:
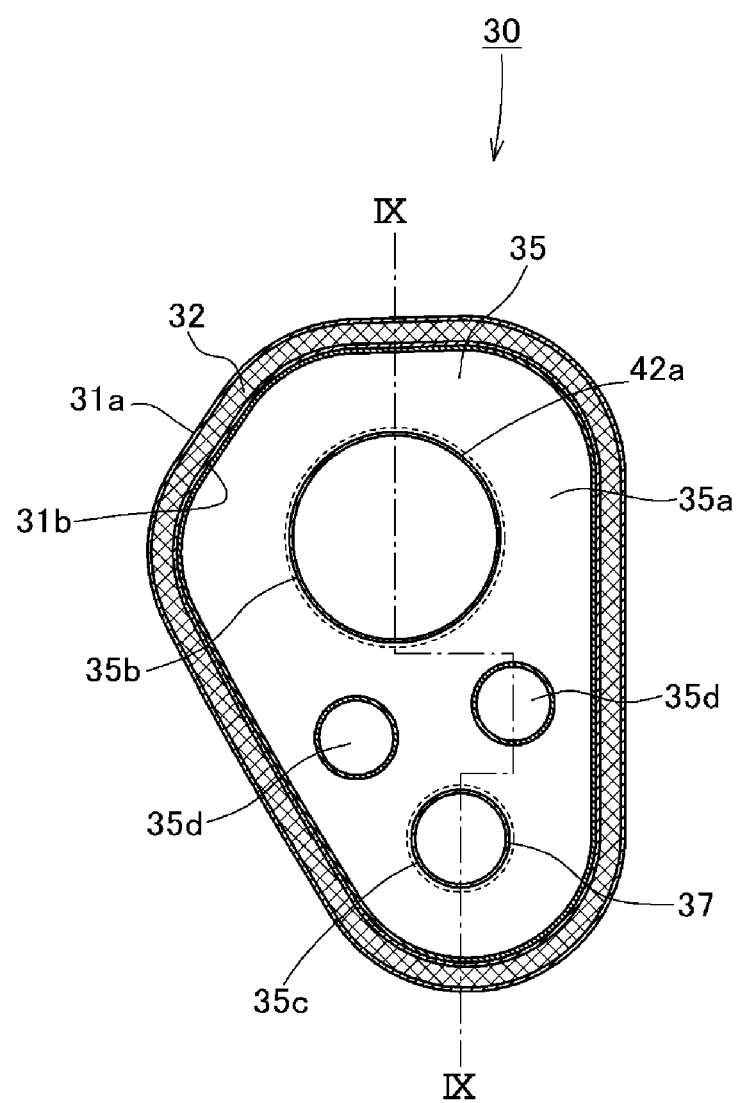
FIG. 12 is a cross-sectional view taken along line XII-XII of FIG. 9.

The front assembly 23 is of a substantially circular cross-sectional shape, as depicted in FIGS. 3 and 5, and the rear assembly 30 is of a non-circular cross-sectional shape that is longer vertically and narrower horizontally, as will be noted from FIGS. 11 and 12. As depicted in FIG. 3, the front assembly 23 has an outside diameter smaller than the outside diameter of the rear assembly 30 and has a constricted shape. The front assembly 23 and the rear assembly 30 are connected to each other by a connector 28 whose cross-sectional area is progressively larger from its front end toward its rear end. The first expansion chamber 45 in the front assembly 23 has an outside diameter smaller than the outside diameters of the second expansion chamber 46 and the third expansion chamber 47 in the rear assembly 30.

The front muffler body 24 includes a front cover 24a connected to the exhaust pipe 21, a first tubular member 24b connected to a rear end of the front cover 24a, and a second tubular member 24c having a front end connected to a rear end of the first tubular member 24b and a rear end connected to the connector 28. The first tubular member 24b and the second tubular member 24c are of substantially the same diameter. The first tubular member 24b extends straight, while the second tubular member 24c is of a gradually curved shape.

The front exhaust passage pipe 41 is provided within the front muffler body 24. As depicted in FIG. 4, the first exhaust passage pipe 41a has an upstream end connected to the downstream end 21a of the exhaust pipe 21. The first exhaust passage pipe 41a is disposed within the front cover 24a and the first tubular member 24b concentrically with the first tubular member 24b, providing inner and outer double-walled pipes. The second exhaust passage pipe 41b is of substantially the same diameter as the outside diameter of the first exhaust passage pipe 41a, and is connected to a downstream end of the first exhaust passage pipe 41a. As depicted in FIG. 3, the second exhaust passage pipe 41b is curved to a shape along the curvature of the second tubular member 24c, and disposed within the second tubular member 24c concentrically therewith.

As depicted in FIG. 4, the first annular plate member 25 and the second annular plate member 26 are disposed between the first tubular member 24b and the front exhaust passage pipe 41 disposed therein, and attached to the first tubular member 24b and the front exhaust passage pipe 41 such that planes of the first annular plate member 25 and the second annular plate member 26 lie perpendicularly to the longitudinal directions of the first tubular member 24b. The first annular plate member 25 is disposed closely to a front end of the first tubular member 24b, while the second annular plate member 26 is disposed closely to a rear end of the first tubular member 24b.

Figure 6:
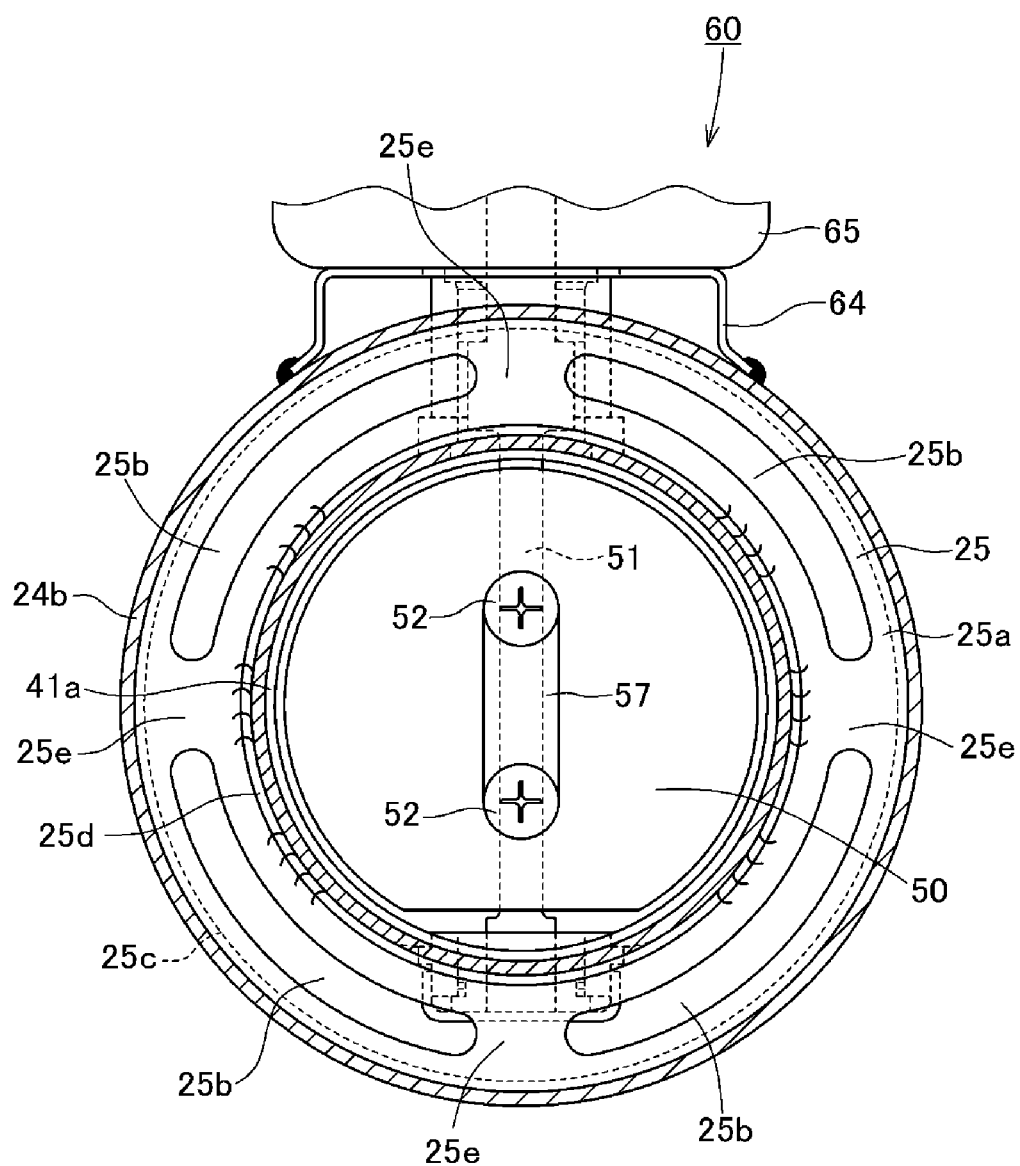
FIG. 6 is a cross-sectional view taken along line VI-VI of FIG. 4, depicting the valve actuator in the upper position.

As depicted in FIG. 6, the first annular plate member 25 includes a ring-shaped annular plate 25a having an outside diameter that is the same as the inside diameter of the first tubular member 24b and an inside diameter that is the same as the outside diameter of the first exhaust passage pipe 41a inserted in the annular plate 25a. The annular plate 25a has a plurality of (four in the present embodiment) fluid communication holes 25b defined therein that provide fluid communication between a first compartment 45a and a second compartment 45b, to be described later, of the first expansion chamber 45. The fluid communication holes 25b are shaped as oblong holes along the circumferential directions of the annular plate 25a, are of identical shapes, and are spaced at equal circumferential intervals. As depicted in FIG. 4, the first annular plate member 25 includes a fixing flange 25c extending rearward from an outer circumferential edge of the annular plate 25a perpendicularly to the annular plate 25a and having a predetermined width, and a fixing flange 25d extending forward from an inner circumferential edge of the annular plate 25a perpendicularly to the annular plate 25a and having a predetermined width.

Figure 7:
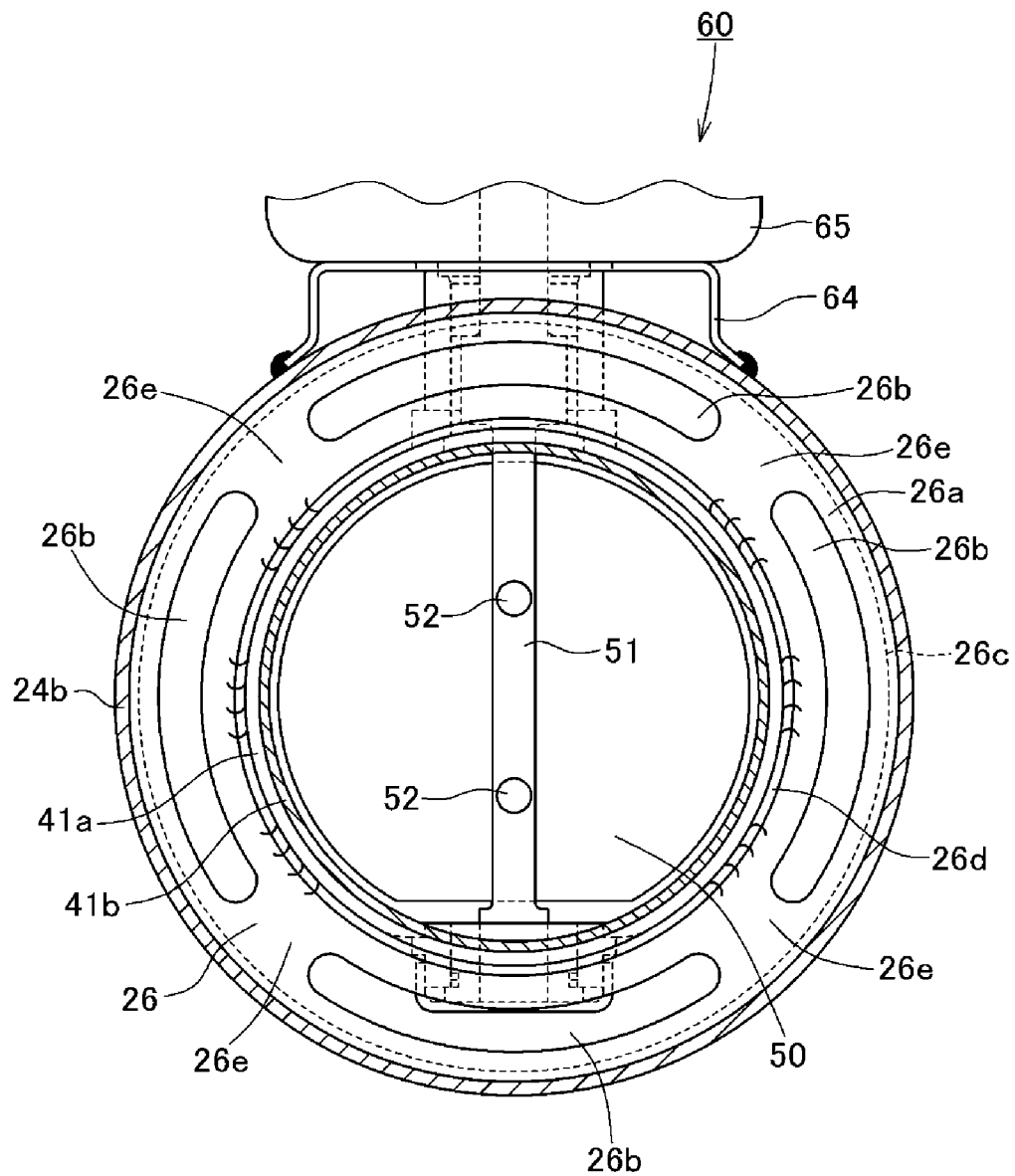
FIG. 7 is a cross-sectional view taken along line VII-VII of FIG. 4, depicting the valve actuator in the upper position.

As depicted in FIGS. 4 and 7, the second annular plate member 26 also includes a ring-shaped annular plate 26a, as with the first annular plate member 25, and fixing flanges 26c and 26d extending forward and rearward from outer and inner circumferential edges of the annular plate 26a perpendicularly thereto and having predetermined widths. The annular plate 26a has an outside diameter that is the same as the inside diameter of the first tubular member 24b and an inside diameter that is the same as the outside diameter of the first exhaust passage pipe 41a inserted in the annular plate 26a. As depicted in FIG. 7, the annular plate 26a has a plurality of (four in the present embodiment) fluid communication holes 26b defined therein that provide fluid communication between the second compartment 45b and a third compartment 45c, to be described later, of the first expansion chamber 45. The fluid communication holes 26b are shaped as oblong holes along the circumferential directions of the annular plate 26a, are of identical shapes, and are spaced at equal circumferential intervals. The fluid communication holes 26b are angularly spaced 45 degrees from the fluid communication holes 25b defined in the first annular plate member 25 about the central axis of the first exhaust passage pipe 41a.

As depicted in FIG. 4, the fixing flange 25c of the first annular plate member 25 is held in abutment against and fixed to an inner circumferential surface of the upstream portion $24b_1$ of the first tubular member 24b, and the fixing flange 25d thereof is held in abutment against and fixed to an outer circumferential surface of the upstream portion $41a_1$ of the first exhaust passage pipe 41a. The upstream portions $24b_1$ and $41a_1$ of the first tubular member 24b and the first exhaust passage pipe 41a, which are provided as the inner and outer double-walled pipes, are integrally connected to each other by the first annular plate member 25 in a manner to close the gap therebetween.

The fixing flange 26c of the second annular plate member 26 is held in abutment against and fixed to an inner circumferential surface of the downstream portion $24b_2$ of the first tubular member 24b, and the fixing flange 26d thereof is held in abutment against and fixed to an outer circumferential surface of the downstream portion $41a_2$ of the first exhaust passage pipe 41a. The downstream portions $24b_2$ and $41a_2$ of the first tubular member 24b and the first exhaust passage pipe 41a, which are provided as the inner and outer double-walled pipes, are integrally connected to each other by the second annular plate member 26 in a manner to close the gap therebetween. The first expansion chamber 45 is divided by the first annular plate member 25 and the second annular plate member 26 into the first compartment 45a, the second compartment 45b, and the third compartment 45c that are successively arranged from the front.

As depicted in FIGS. 4 and 5, the exhaust valve 50 for opening and closing the exhaust passage pipe 40 is provided in the first exhaust passage pipe 41a thereof that is positioned upstream. The exhaust valve 50 is controlled for its opening and closing operation depending on the output power of the internal combustion engine E. The exhaust valve 50 serves as a device for silencing exhaust gases by changing flow passageways for the exhaust gases thereto to expand the exhaust gases, and also for adjusting the characteristics of the internal combustion engine E by applying a back pressure to the exhaust gases. The exhaust valve 50 is disposed in a region of the exhaust muffler 22 where the first tubular member 24b and the first exhaust passage pipe 41a are provided as the inner and outer double-walled pipes, and is positioned between the first annular plate member 25 and the second annular plate member 26 with respect to the direction along which the exhaust gases flow. The exhaust valve 50 is of a disk shape whose outer edge extends along an inner circumferential surface of the first exhaust passage pipe 41a. As depicted in FIG. 4, the exhaust valve 50 has an outside diameter d2 smaller than an inside diameter d1 of the first exhaust passage pipe 41a, allowing a very small amount of exhaust gases to pass through the gap between the exhaust valve 50 and the first exhaust passage pipe 41a.

As depicted in FIGS. 5 through 8, the exhaust valve 50 includes an exhaust valve shaft 51 fastened thereto by a pair of screws 52 with a washer 57 interposed therebetween. The exhaust valve shaft 51 is coupled to a valve actuator 60 that opens and closes the exhaust valve 50. As depicted in FIG. 3, the exhaust valve shaft 51 extends through outer surfaces of the first exhaust passage pipe 41a and the first tubular member 24b of the front assembly 23 of the exhaust muffler 22, and the valve actuator 60 is disposed on an outer side surface of the exhaust muffler 22. As depicted in FIG. 5, the exhaust valve shaft 51 is angularly movably supported by bearings 53 on an upper support member 54 mounted on an upper portion of the first exhaust passage pipe 41a and a lower support member 55 mounted on a lower portion of the first exhaust passage pipe 41a. A cap 56 for preventing the exhaust valve shaft 51 from coming off is attached to a lower surface of the lower support member 55.

Figure 8:
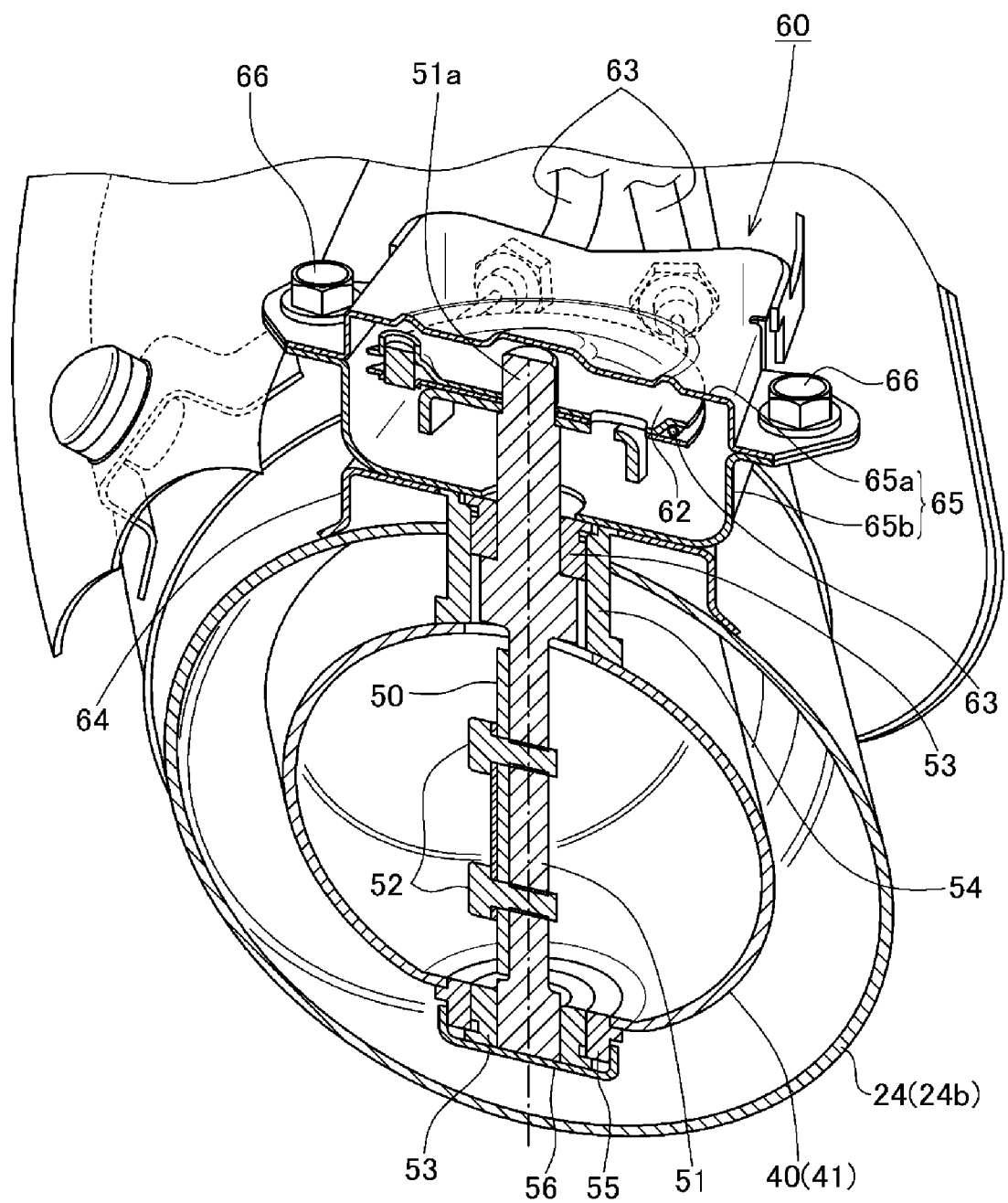
FIG. 8 is a perspective view of the front assembly partly cut away along a plane lying along an axis about which the exhaust valve is actuated.

As depicted in FIGS. 5 and 8, the exhaust valve shaft 51 has an upper portion 51a extending upward through upper portions of the first exhaust passage pipe 41a and the first tubular member 24b of the front muffler body 24. A pulley 62 is mounted on the upper portion 51a of the exhaust valve shaft 51 for angular movement in unison therewith, and a drive wire 63 is trained around the pulley 62. When the drive wire 63 is pulled by a drive device, not shown, the exhaust valve shaft 51 is angularly moved about its own axis, opening and closing the exhaust valve 50 in the exhaust passage pipe 40. The pulley 62 has its peripheral area covered with a case 65 that is made up of an upper case body 65a and a lower case body 65b which are integrally fastened to each other by a pair of bolts 66. The case 65 is supported on a base 64 welded to an outer surface of the first tubular member 24b.

As depicted in FIG. 4, the first exhaust passage pipe 41a of the front exhaust passage pipe 41 of the exhaust passage pipe 40 has a plurality of through holes 40b formed therein between an area where the front end 22a of the exhaust muffler 22 is connected and an area where the exhaust valve 50 is provided, the through holes 40b providing fluid communication between the inside of the exhaust passage pipe 40 and the first expansion chamber 45. When the exhaust valve 50 closes the exhaust passage pipe 40, exhaust gases flowing from the exhaust pipe 21 into the exhaust passage pipe 40 pass through the through holes 40b and flow into the first compartment 45a of the first expansion chamber 45.

As depicted in FIG. 3, the rear assembly 30 is connected to the downstream side of the front assembly 23 through the connector 28. The rear assembly 30 includes the rear muffler body 31, the first partition wall 34 and the second partition wall 35 that divide the interior of the rear muffler body 31, a downstream end wall 36 that closes a downstream end of the rear muffler body 31, the rear exhaust passage pipe 42, and the fluid communication pipe 37. The rear exhaust passage pipe 42 is connected to a downstream end of the front exhaust passage pipe 41, extends through the first partition wall 34, the second partition wall 35, and the downstream end wall 36, and is held in fluid communication with the ambient air. The fluid communication pipe 37 extends through the first partition wall 34 and the second partition wall 35, and is held in fluid communication with the first expansion chamber 45 and the second expansion chamber 46.

Figure 9:
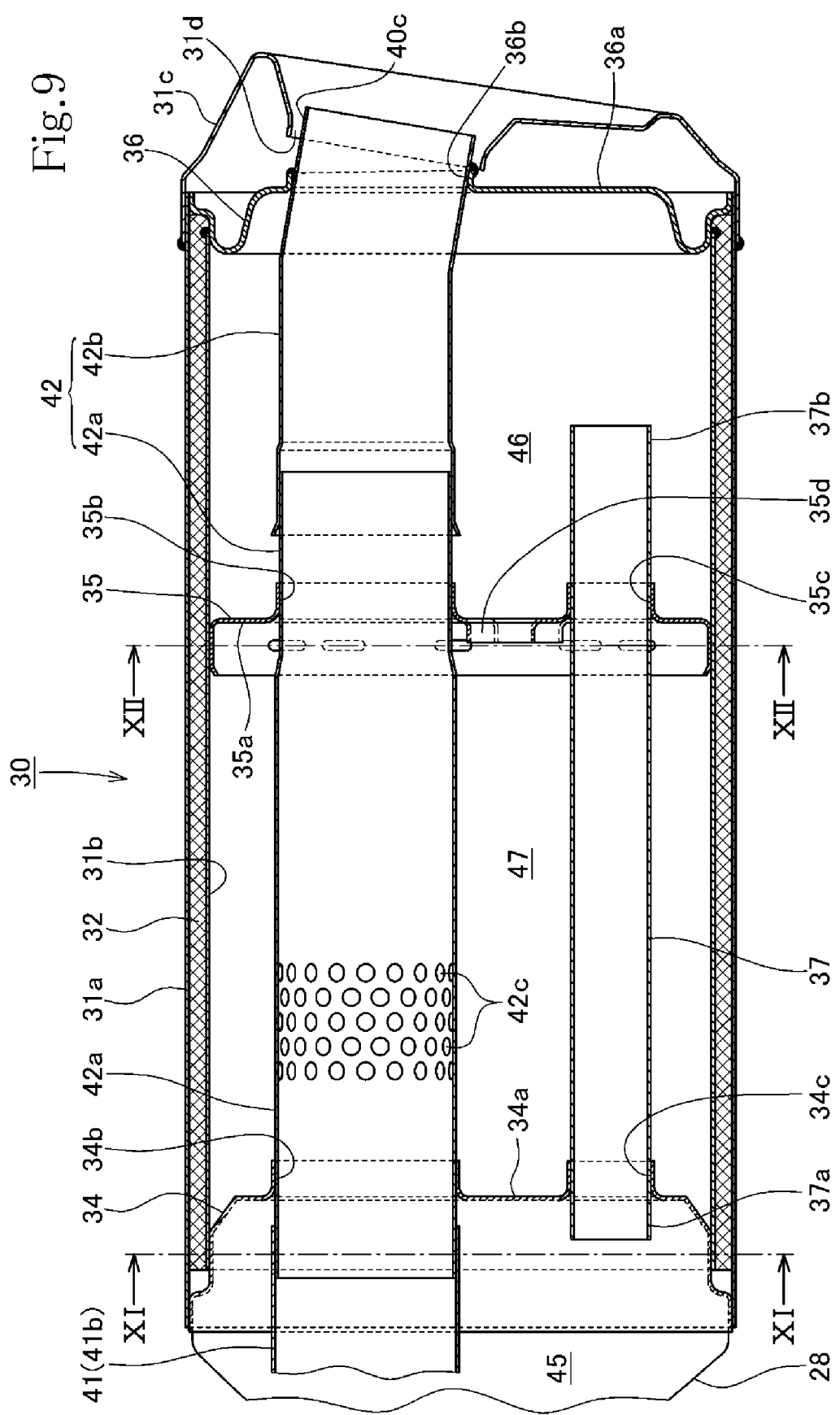
FIG. 9 is a sectional view of a rear assembly taken along line IX-IX of FIG. 12.
Figure 10:
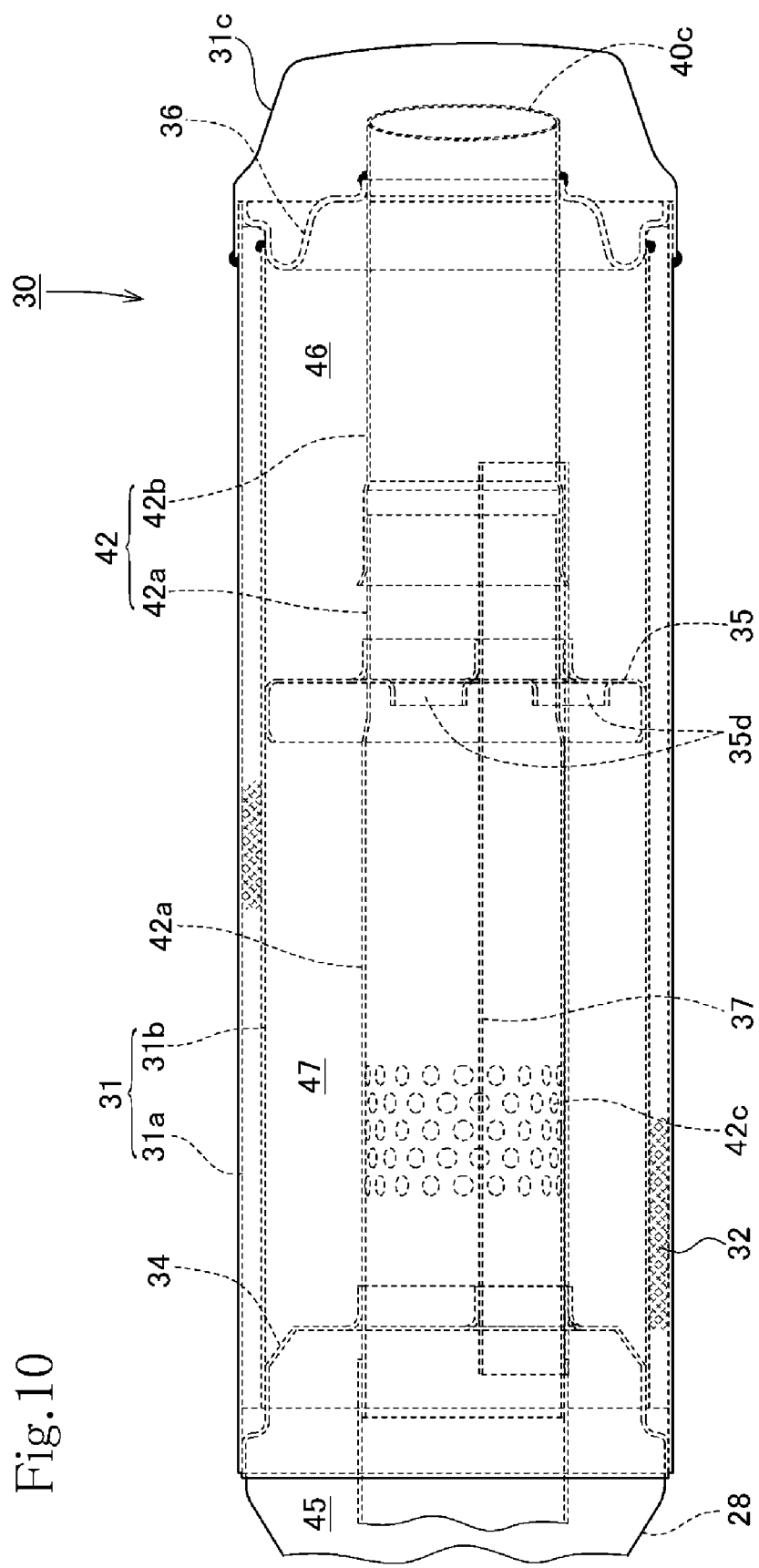
FIG. 10 is a plan view of the rear assembly.

As depicted in FIGS. 9 and 10, the rear muffler body 31 includes a tubular outer body 31a and an inner body 31b disposed in the outer body 31a with a predetermined gap therebetween. The gap between the outer body 31a and the inner body 31b is filled up with a filling material 32 such as glass wool or the like for heat insulation and sound absorption. A tail cover 31c is mounted on a downstream end of the outer body 31a and has an exhaust passage pipe insertion hole 31d defined therein. As depicted in FIGS. 11 and 12, the rear muffler body 31 is of a noncircular cross-sectional shape perpendicular to the flow of exhaust gases, which is vertically elongate, widest at a portion slightly above its center, and progressively narrower in a downward direction.

As shown in FIG. 9, the rear exhaust passage pipe 42 is made up of a third exhaust passage pipe 42a connected to the downstream end of the second exhaust passage pipe 41b of the front exhaust passage pipe 41 and a fourth exhaust passage pipe 42b connected to the downstream end of the third exhaust passage pipe 42a. The fourth exhaust passage pipe 42b has a downstream end inserted in the exhaust passage pipe insertion hole 31d in the tail cover 31c, and the exhaust passage pipe 40 has a downstream end 40c held in fluid communication with the ambient air. The third exhaust passage pipe 42a of the rear exhaust passage pipe 42 has a plurality of through holes 42c defined therein which provides fluid communication between the inside of the rear exhaust passage pipe 42 and the third expansion chamber 47. The through holes 42c are provided to allow exhaust gases that have passed successively through the first expansion chamber 45, the second expansion chamber 46, and the third expansion chamber 47 to pass through the through holes 42c and flow into the rear exhaust passage pipe 42, from which the exhaust gases are discharged through the downstream end 40c of the exhaust passage pipe 40.

Figure 13:
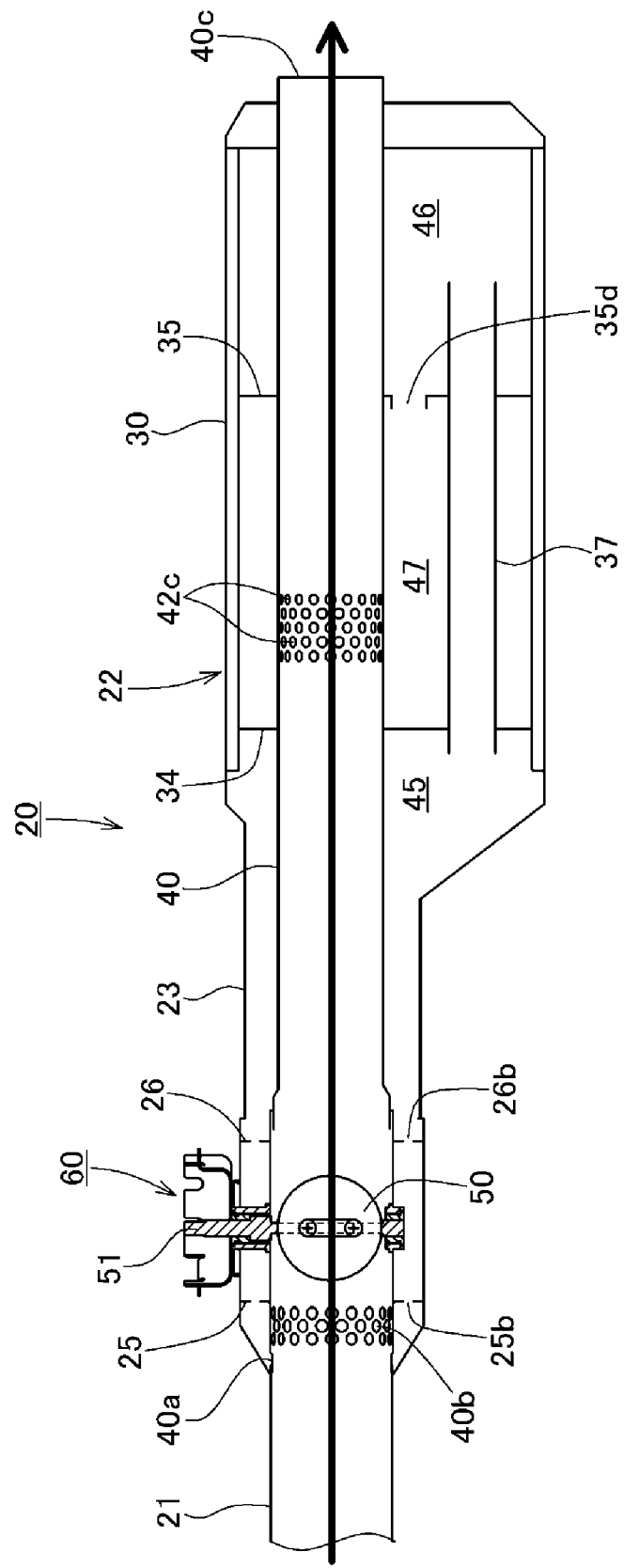
FIG. 13 is a schematic view of an exhaust muffler device, depicting a flow of exhaust gases while the exhaust valve is open.

As depicted in FIGS. 3, 9, and 13, the interior of the exhaust muffler 22 is divided by the first partition wall 34 and the second partition wall 35 into the first expansion chamber 45, the third expansion chamber 47, and the second expansion chamber 46 that are arranged successively from the front. As depicted in FIG. 11, the first partition wall 34 has an exhaust passage pipe insertion hole 34b defined in an upper portion of a wall 34a thereof for insertion of the third exhaust passage pipe 42a therein, and a fluid communication pipe insertion hole 34c defined in a lower portion of the wall 34a for insertion of the fluid communication pipe 37 therein. As depicted in FIG. 12, the second partition wall 35 has an exhaust passage pipe insertion hole 35b defined in an upper portion of a wall 35a thereof for insertion of the third exhaust passage pipe 42a therein, a fluid communication pipe insertion hole 35c defined in a lower portion of the wall 35a for insertion of the fluid communication pipe 37 therein, and a pair of left and right fluid communication holes 35d defined therein in a region between the exhaust passage pipe insertion hole 35b and the fluid communication pipe insertion hole 35c for providing fluid communication between the second expansion chamber 46 and the third expansion chamber 47. As FIG. 9 shows, the first partition wall 34 and the second partition wall 35 are fixedly mounted in the rear muffler body 31.

The rear exhaust passage pipe 42 is inserted in the exhaust passage pipe insertion holes 34b, 35b, and 36b in the first partition wall 34, the second partition wall 35, and the downstream end wall 36 and supported by the first partition wall 34, the second partition wall 35, and the downstream end wall 36. The fluid communication pipe 37 is inserted in the fluid communication pipe insertion holes 34c and 35c in the first and second partition walls 34 and 35 and supported by the first and second partition walls 34 and 35.

According to the present embodiment, the number of the fluid communication holes 25b in the first annular plate member 25 and the number of the fluid communication holes 26b in the second annular plate member 26 are the same as each other, i.e., four. However, the number of the fluid communication holes 25b in the first annular plate member 25 may be larger than the number of the fluid communication holes 26b in the second annular plate member 26. The larger number of the fluid communication holes 25b on the upstream side promotes diffusion of exhaust gases, and the smaller number of the fluid communication holes 26b on the downstream side permits each of the fluid communication holes 26b to be increased in size, thereby making it easy to discharge exhaust gases from the front assembly 23 and hence to prevent exhaust gases from staying stagnant in the front assembly 23.

Flows of exhaust gases in the exhaust device 20 in the present embodiment of the invention will be described below with reference to FIGS. 13 and 14. FIG. 13 schematically shows a flow of exhaust gases while the exhaust valve 50 is open. When the valve actuator 60 is operated to open the exhaust valve 50, exhaust gases emitted from the internal combustion engine E pass through the exhaust pipe 21, flow from the downstream end 21a of the exhaust pipe 21 through the upstream end of the exhaust passage pipe 40 into the exhaust passage pipe 40, and most of them then are discharged into the ambient air from the downstream end 40c of the exhaust passage pipe 40. Though some of the exhaust gases in the exhaust passage pipe 40 pass through the through holes 40b into the first compartment 45a of the first expansion chamber 45, most of the exhaust gases are discharged from the downstream end 40c of the exhaust passage pipe 40. While the exhaust valve 50 is open, therefore, the exhaust gases are discharged directly from the exhaust passage pipe 40 into the ambient air, and do not reduce the output power of the internal combustion engine E.

Figure 14:
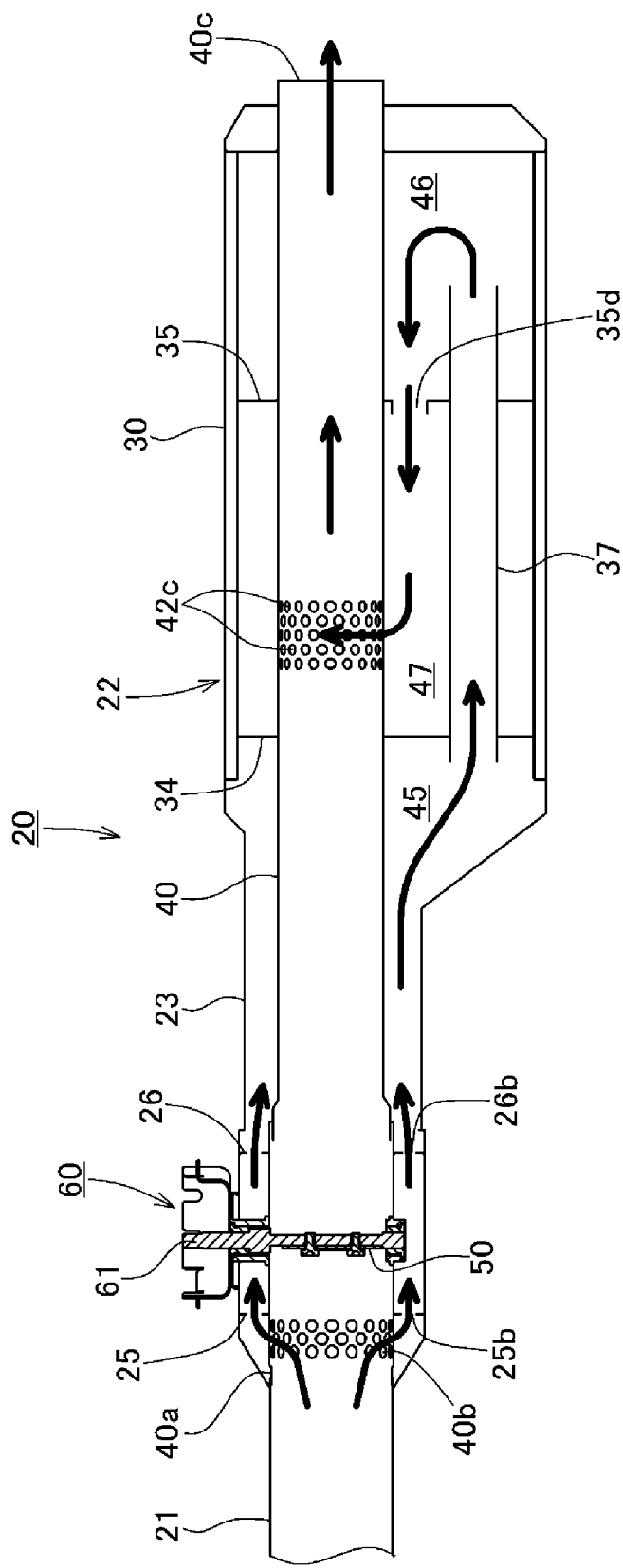
FIG. 14 is a schematic view of the exhaust muffler device, depicting a flow of exhaust gases while the exhaust valve is closed.

FIG. 14 schematically depicts a flow of exhaust gases while the exhaust valve 50 is closed. Providing the output power of the internal combustion engine E is very small, when the valve actuator 60 is operated to close the exhaust valve 50, and the exhaust gases emitted from the exhaust pipe 21 are blocked as the first exhaust passage pipe 41a is closed by the exhaust valve 50. Since the amount of exhaust gases emitted from the internal combustion engine E is small in this state, most of the exhaust gases pass through the gap between the outer circumferential edge of the exhaust valve 50 and the inner circumferential surface of the first exhaust passage pipe 41a. The pressure wave generated by the exhaust gases, which causes exhaust sounds, passes through the through holes 40b in the front exhaust passage pipe 41 upstream of the exhaust valve 50 and is transmitted into the first compartment 45a of the first expansion chamber 45.

Thereafter, the pressure wave passes from the first compartment 45a through the fluid communication holes 25b in the first annular plate member 25 into the second compartment 45b, then from the second compartment 45b through the fluid communication holes 26b in the second annular plate member 26 into the third compartment 45c. Then, the pressure wave passes through the fluid communication pipe 37 that is open into the third compartment into the second expansion chamber 46. Thereafter, the pressure wave passes from the second expansion chamber 46 through the fluid communication holes 35d in the second partition wall 35 into the third expansion chamber 47, then from the third expansion chamber 47 through the fluid communication holes 42c in the rear exhaust passage pipe 42 into the exhaust passage pipe 40, and is discharged into the ambient air from the downstream end 40c of the exhaust passage pipe 40. While the exhaust valve 50 is closed, therefore, the exhaust gases emitted from the internal combustion engine E pass through the exhaust passage pipe 40, while the pressure wave of the exhaust gases passes through the expansion chambers 45, 46, and 47, so that the exhaust sounds are reduced.

The exhaust valve 50 is controlled so as to be opened in proportion to the output power of the internal combustion engine E. The opening of the exhaust valve 50 is adjusted to cause the exhaust gases to flow in a manner to match the characteristics of the internal combustion engine E, thereby adjusting the flow rate of the exhaust gases. As the pressure wave is caused to pass into the expansion chambers (first expansion chamber 45) upstream of the exhaust valve 50, the noise of the exhaust gases that increases in proportion to the output power is effectively silenced. The exhaust muffler structure described above is able to separate an exhaust output route and a sound route from each other, so that the output power can be adjusted by a simple structure while a satisfactory silencing capability is achieved. Since the exhaust valve 50 is of the butterfly type, the output power of the internal combustion engine E can be set to a desired level and the silencing capability for the exhaust sounds can be set to a desired level by changing the opening of the exhaust valve 50.

Inasmuch as the exhaust device 20 for the internal combustion engine according to the embodiment of the present invention is of the above structure, it offers the following advantages.

With the exhaust device 20 according to the present embodiment, the exhaust muffler 22 is made up of a plurality of layers as the exhaust passage pipe 40 and the expansion chambers around the outer periphery of the exhaust passage pipe 40. Of the exhaust muffler 22, the front assembly 23 connected to the exhaust pipe 21 serves as a single assembly including the front exhaust passage pipe 41 and the front muffler body 24 that make up double-walled pipes, with the exhaust valve 50 disposed in the front exhaust passage pipe 41, and the rear assembly 30 as another assembly. After the front assembly 23 and the rear assembly 30 have been sub-assembled separately, the front assembly 23 and the rear assembly 30 are integrally assembled together into the exhaust device 20, providing the exhaust device. The accuracy of a position where the exhaust valve 50 is installed is therefore increased.

Furthermore, in a case where the exhaust muffler 22 includes the front muffler body 24 and the rear muffler body 31 that have different cross-sectional shapes, the exhaust valve 50 is disposed in the front assembly 23 that incorporates the front muffler body 24 shaped to have a circular cross section, and the valve actuator 60 for opening and closing the exhaust valve 50 is provided on the outer side of the front muffler body 24. With this arrangement, the layout freedom of the exhaust valve 50 in the circumferential directions of the exhaust muffler 22 can be increased.

Of the expansion chambers 45, 46, and 47, the first expansion chamber 45 is provided between the front exhaust passage pipe 41 and the front muffler body 24, the front exhaust passage pipe 41 of the exhaust muffler is generally of the same diameter as the rear exhaust passage pipe 42, and the outside diameter of the first expansion chamber 45 around the front exhaust passage pipe 41 is smaller than the outside diameters of the second expansion chamber 46 and the third expansion chamber 47 in the rear muffler body 31. Therefore, the length of the exhaust valve shaft 51 that connects the exhaust valve 50 and the valve actuator 60 to each other is reduced, thus minimizing twisting of the exhaust valve shaft 51 to minimize an operational delay of the exhaust valve 50.

Furthermore, the front end 22a of the exhaust muffler 22 is connected to the downstream end 21a of the exhaust pipe 21, the upstream end 40a of the exhaust passage pipe 40 positioned upstream of the exhaust valve 50 is connected to the exhaust pipe 21 in the exhaust muffler 22, and the exhaust passage pipe 40 has the through holes 40b formed therein between the area where the front end 22a of the exhaust muffler 22 is connected and the area where the exhaust valve 50 is provided, the through holes 40b being held in fluid communication with the first expansion chamber 45. Consequently, when the exhaust valve 50 is closed, exhaust gases are caused to flow into the first expansion chamber 45 by a simple structure.

The portion of the exhaust muffler 22 where the exhaust valve 50 is disposed includes the first tubular member 24b of the front muffler body 24 and the first exhaust passage pipe 41a as a plurality of tubular members providing inner and outer double-walled pipes, the upstream portions $24b_1$ and $41a_1$ of the first tubular member 24b and the first exhaust passage pipe 41a and the downstream portions $24b_2$ and $41a_2$ thereof are integrally connected to each other respectively by the first annular plate member 25 and the second annular plate member 26 that close the gap therebetween, and the first annular plate member 25 and the second annular plate member 26 have the fluid communication holes 25b and 26b formed therein through which exhaust gases flow. The space of the first expansion chamber 45 can simply be created using the first annular plate member 25 and the second annular plate member 26, and the plural members can easily be integrated.

As the fluid communication holes 25b and 26b in the first annular plate member 25 and the second annular plate member 26 are disposed at circumferentially spaced intervals, exhaust gases that are flowing in are diffused in outer circumferential directions through the fluid communication holes 25b and 26b for a balanced flow of exhaust gases.

Moreover, the first annular plate member 25 and the second annular plate member 26 have radial extensions 25e and 26e separating adjacent ones of the fluid communication holes 25b and 26b and disposed radially, and one of the radial extensions 25e and 26e is positioned in overlapping relation to the exhaust valve shaft 51 of the exhaust valve 50 in the direction of the flow passage. Consequently, the resistance of the flow passage is prevented from increasing without an increase in the areas of closures provided by the exhaust valve shaft 51 and the radial extensions 25e and 26e.

The exhaust muffler 22 includes the exhaust device mount member 38 by which the exhaust device 20 is mounted on the vehicle. The exhaust device mount member 38 includes the front mount 38a and the rear mount 38c, the front mount piece 38b extending from the front mount 38a upward of the front muffler body 24, and the rear mount piece 38d extending from the rear mount 38c and joining the rear mount 38c to the upper end of the front mount piece 38b. Further, the mount boss 38e to be mounted on the motorcycle 1 is provided on the junction between the front mount piece 38b and the rear mount piece 38d. Therefore, the exhaust muffler is suspended by the front mount 38a and the rear mount 38c by way of the front mount piece and the rear mount piece in a triangular layout on the vehicle mount, and hence the rigidity with which the exhaust muffler is suspended is increased.

Since the number of the fluid communication holes 25b in the first annular plate member 25 disposed on the upstream side may be larger than the number of the fluid communication holes 26b in the second annular plate member 26 disposed on the downstream side, the larger number of the fluid communication holes 25b on the upstream side may promote diffusion of exhaust gases, and the smaller number of the fluid communication holes 26b on the downstream side may permit each of the fluid communication holes 26b to be increased in size, thereby making it easy to discharge exhaust gases from the front assembly 23 and hence to prevent exhaust gases from staying stagnant in the front assembly 23.

Figure 15:
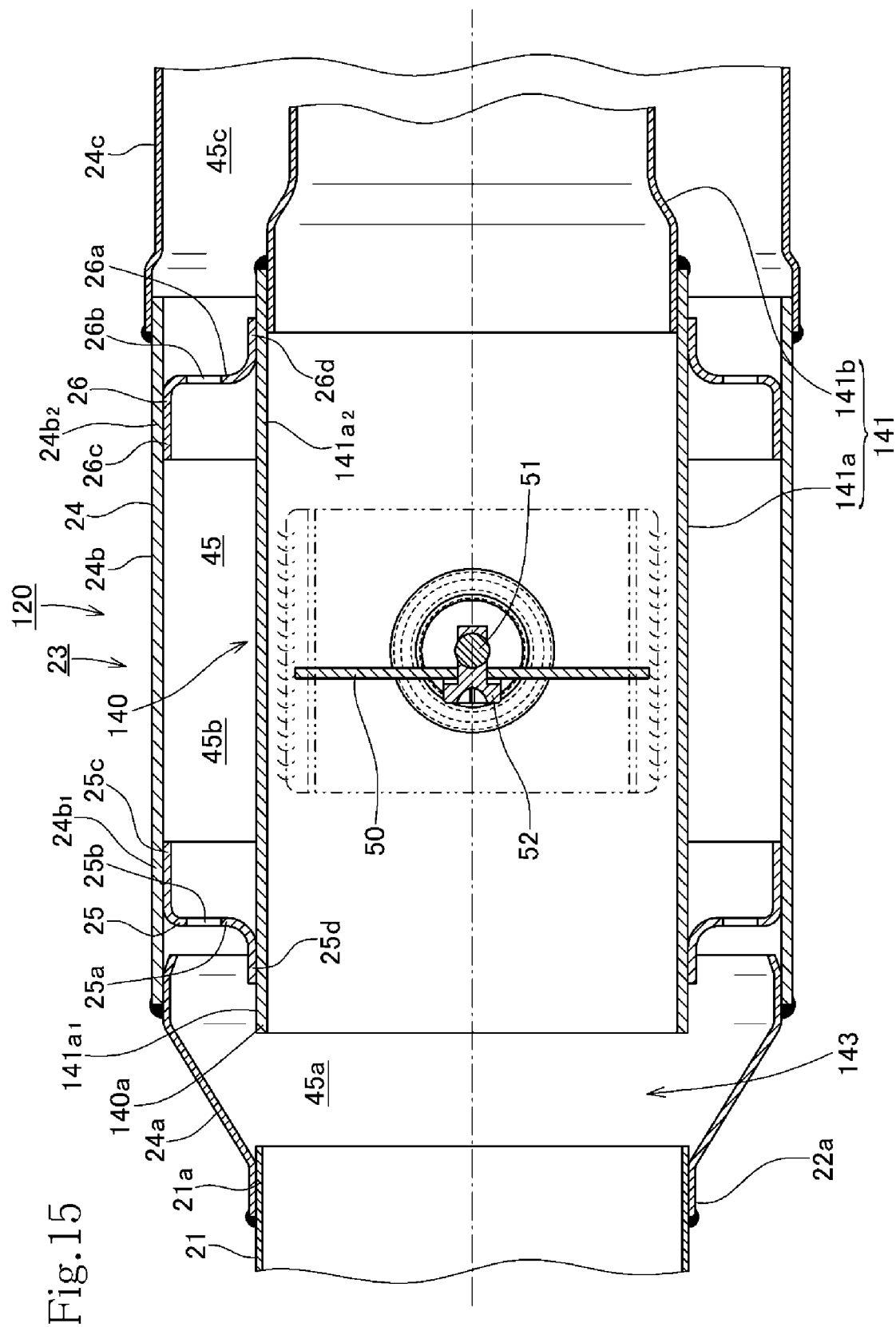
FIG. 15 is a sectional view of a front assembly and its periphery of an exhaust device for an internal combustion engine according to a second embodiment of the present invention.

An exhaust device 120 for an internal combustion engine according to a second embodiment of the present invention will be described below with reference to FIG. 15. Those structural details that are identical to those of the first embodiment will be described using the reference symbols of the first embodiment. In the exhaust device 20 according to the first embodiment, the upstream end 40a of the exhaust passage pipe 40 is connected to the downstream end 21a of the exhaust pipe 21. In the exhaust device 120 according to the second embodiment, an upstream end 140a of an exhaust passage pipe 140m, serving as an exhaust passage to which exhaust gases are delivered from the exhaust pipe 21, is not connected to the downstream end 21a of the exhaust pipe 21, but spaced a predetermined interval from the downstream end 21a of the exhaust pipe 21. The exhaust pipe 21 and the first expansion chamber 45 are held in fluid communication with each other through a gap 143 between the downstream end 21a of the exhaust pipe 21 and the upstream end 140a of the exhaust passage pipe 140. When the exhaust valve 50 is closed, exhaust gases flowing from the exhaust pipe 21 flow from the gap 143 into the first expansion chamber 45. When the exhaust valve 50 is open, exhaust gases flow from the exhaust pipe 21 into the exhaust passage pipe 140 and are discharged into the ambient air from a downstream end 140c of the exhaust passage pipe 140.

According to the second embodiment, therefore, since the exhaust pipe 21 and the exhaust passage pipe 140 are not connected to each other, and exhaust gases from the exhaust pipe 21 flow into the first expansion chamber 45 through the gap 143 between the exhaust pipe 21 and the exhaust passage pipe 140, no connection is necessary between the exhaust pipe 21 and the exhaust passage pipe 140, and the exhaust passage pipe 140 does not need to have fluid communication holes for fluid communication with the first expansion chamber, resulting in a much simpler structure.

Figure 16:
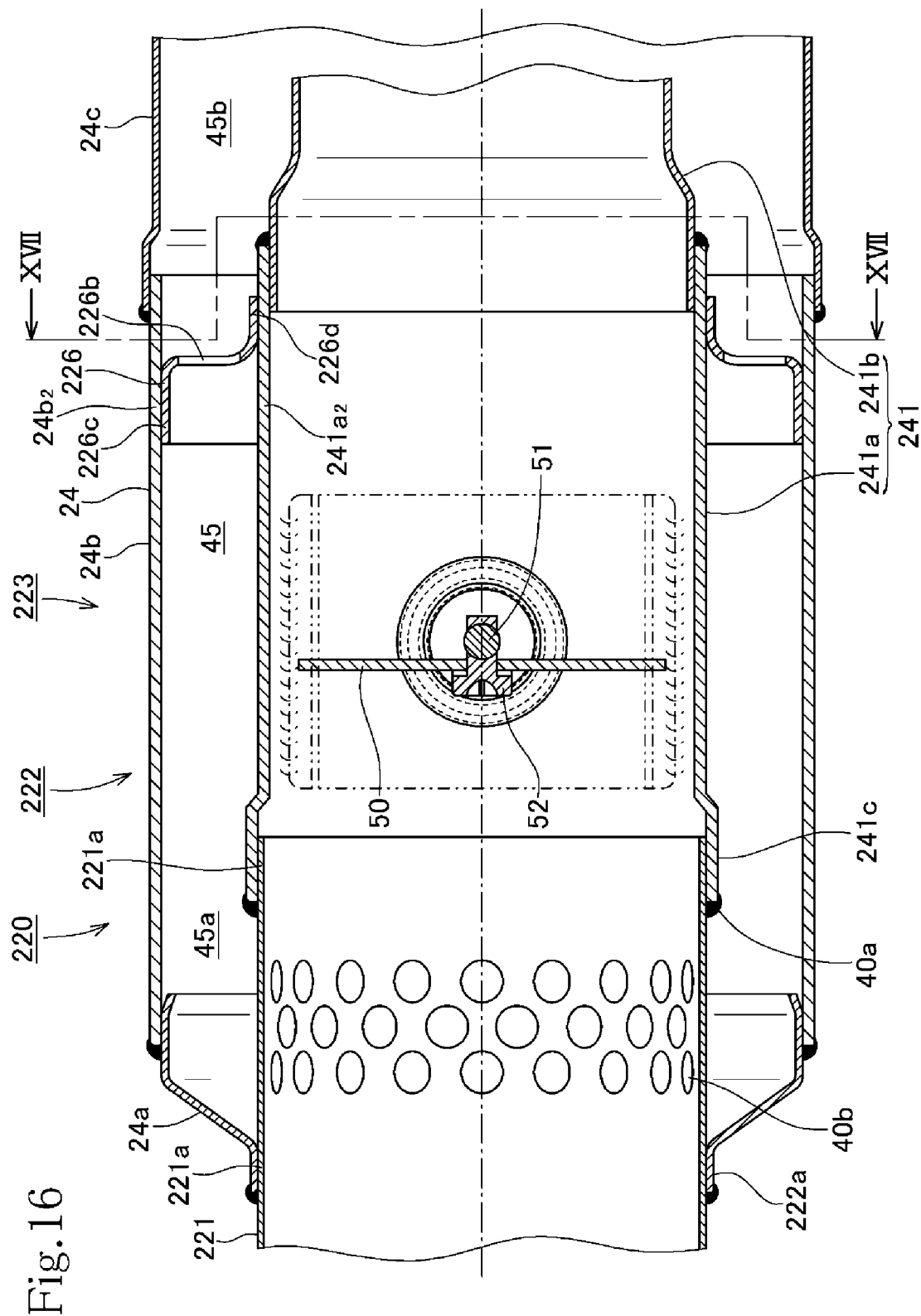
FIG. 16 is a fragmentary horizontal sectional view of a front assembly of an exhaust device for an internal combustion engine according to a third embodiment of the present invention.
Figure 17:
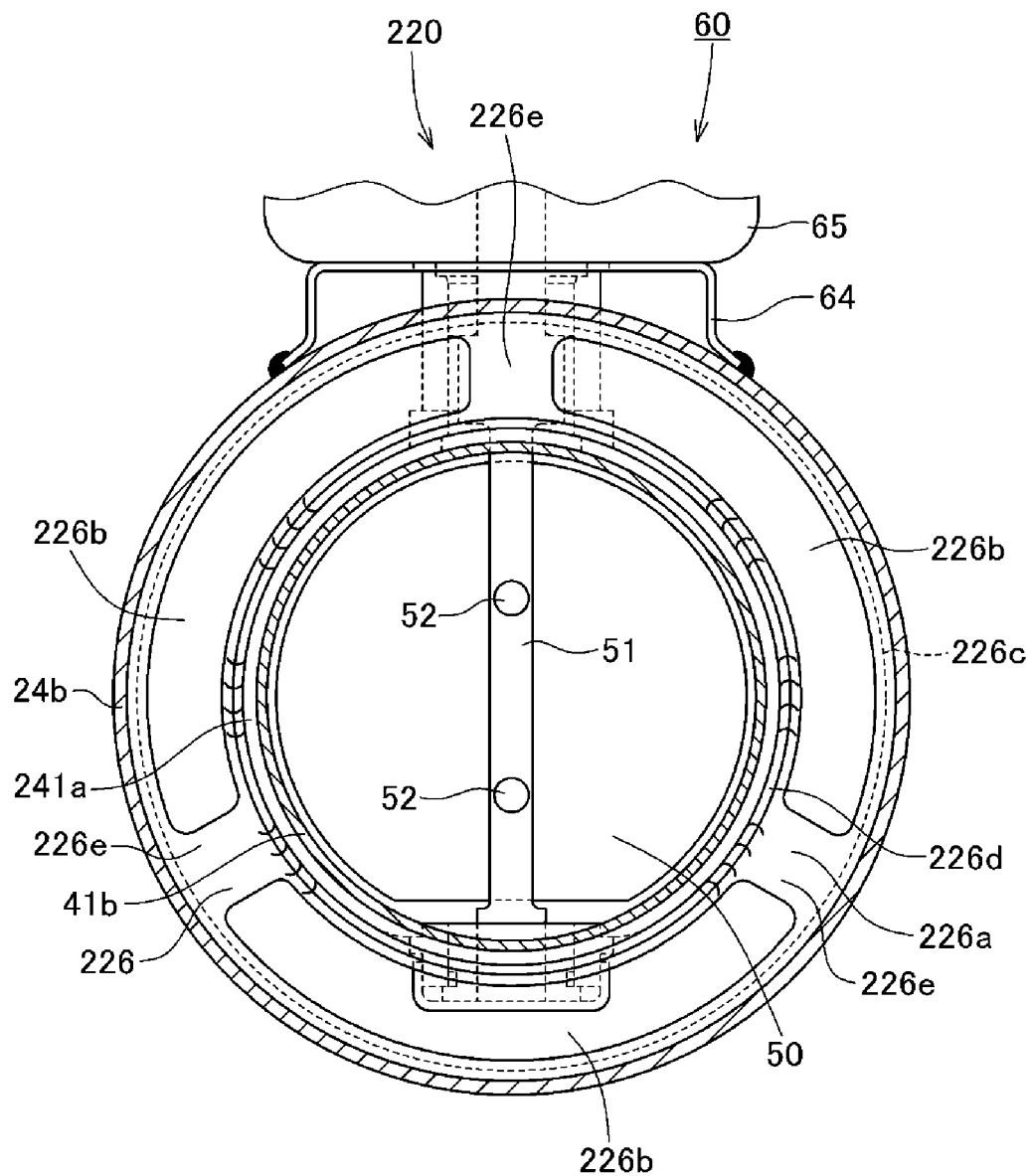
FIG. 17 is a cross-sectional view taken along line XVII-XVII of FIG. 16, depicting a valve actuator in an upper position.

An exhaust device 220 for an internal combustion engine according to a third embodiment of the present invention will be described below with reference to FIGS. 16 and 17. Those structural details that are identical to those of the first embodiment will be described using the reference symbols of the first embodiment. In the exhaust device 220 according to the third embodiment, a downstream end 221a of an exhaust pipe 221 is fitted in and held by a front end 241c of a front exhaust passage pipe 241a of an exhaust passage pipe 241. The first annular plate member 25 is dispensed with, but only a second annular plate member 226 is provided downstream of the exhaust valve 50. According to the present embodiment, though the downstream end 221a of the exhaust pipe 221 is fitted in and held by the front end 241c of the front exhaust passage pipe 241a of the exhaust passage pipe 241, the downstream end 221a of the exhaust pipe 221 may be fitted over and held by the front end 241c of the front exhaust passage pipe 241a of the exhaust passage pipe 241. According to the present embodiment, since the first annular plate member 25 according to the first embodiment is dispensed with, the first expansion chamber 45 is divided into two compartments, i.e., the first compartment 45a positioned on a front side and the second compartment 45b positioned on a rear side. According to the present embodiment, furthermore, the second annular plate member 226 has fluid communication holes 226b which, as depicted in FIG. 17, have radial widths that are in agreement with the maximum width of an annular plate 226a that serves as the width of a flow passageway for exhaust gases, making exhaust gases in the first expansion chamber 45 likely to be discharged and preventing exhaust gases from staying stagnant therein.

In the exhaust device 220 according to the third embodiment, inasmuch as the downstream end 221a of the exhaust pipe 221 is fitted in or over and held by the front end 241c of the front exhaust passage pipe 241a, the first annular plate member 25 is dispensed with, and the radial width of the fluid communication holes 226b in the second annular plate member 226 is maximized to maximize the cross-sectional area of the flow passageway for exhaust gases, so that the resistance to flow of exhaust gases is reduced and the number of parts used is reduced for a cost reduction.

Although the embodiments of the present invention have been described in detail above, the present invention is not limited to the above embodiments, but various other changes and modifications may be made therein. The exhaust device 20 according to the present invention is not limited to use on the motorcycle 1, but is also widely applicable to other types of saddle-type vehicles.

REFERENCE SIGNS LIST

E . . . Internal combustion engine,
1 . . . Motorcycle, 20 . . . Exhaust device, 21 . . . Exhaust pipe, 21a . . . Downstream end, 22 . . . Exhaust muffler, 22a . . . Front end, 23 . . . Front assembly, 24 . . . Front muffler body, 24b . . . First tubular member, 24c . . .

Second tubular member, 25 . . . First annular plate member, 25b . . . Fluid communication hole, 26 . . . Second annular plate member, 26b . . . Fluid communication hole,
30 . . . Rear assembly, 31 . . . Rear muffler body, 34 . . . First partition wall, 35 . . . Second partition wall,
40 . . . Exhaust passage pipe, 40a . . . Upstream end, 41 . . . Front exhaust passage pipe, 41a . . . First exhaust passage pipe, 41b . . . Second exhaust passage pipe, 42 . . . Rear exhaust passage pipe, 42a . . . Third exhaust passage pipe, 42b . . . Fourth exhaust passage pipe, 45 . . . First expansion chamber, 46 . . . Second expansion chamber, 47 . . . Third expansion chamber,
50 . . . Exhaust valve,
60 . . . Valve actuator,
120 . . . Exhaust device, 140 . . . Exhaust passage pipe, 141 . . . Front exhaust passage pipe, 141a . . . First exhaust passage pipe, 143 . . . Gap,
220 . . . Exhaust device, 221 . . . Exhaust pipe, 226 . . . Second annular plate member

The invention claimed is:

1. An exhaust device for an internal combustion engine, comprising:
an exhaust pipe; and
an exhaust muffler connected to a downstream end of said exhaust pipe, said exhaust muffler extending from a portion thereof connected to said exhaust pipe rearward on a vehicle on which said exhaust muffler is installed;
a plurality of expansion chambers defined in said exhaust muffler;
an exhaust passage pipe extending through said expansion chambers for allowing exhaust gases from said exhaust pipe to flow therethrough; and
an exhaust valve provided in said exhaust passage pipe for opening and closing said exhaust passage pipe to switch between flow passageways for exhaust gases,
wherein said exhaust muffler is made up of a plurality of layers including said exhaust passage pipe and said expansion chambers provided around an outer periphery of said exhaust passage pipe,
wherein said exhaust muffler includes a front assembly connected to said exhaust pipe and a rear assembly connected to a rear portion of said front assembly and sub-assembled separately from said front assembly,
wherein said exhaust passage pipe includes a front exhaust passage pipe as part of said front assembly, with said exhaust valve being disposed in said front exhaust passage pipe, and a rear exhaust passage pipe as part of said rear assembly,
wherein said front assembly includes said front exhaust passage pipe, a front muffler body disposed in covering relation to an outside of said front exhaust passage pipe to cooperate with said front exhaust passage pipe in making up double-walled pipes, and said exhaust valve,
wherein said rear assembly includes said rear exhaust passage pipe and a rear muffler body disposed in covering relation to an outside of said rear exhaust passage pipe to cooperate with said rear exhaust passage pipe in making up double-walled pipes, and said front exhaust passage pipe connected to the downstream end of said exhaust pipe,
wherein said front muffler body is of a circular cross-sectional shape and said rear muffler body is of a non-circular cross-sectional shape, and
wherein a valve actuator coupled to said exhaust valve for opening and closing said exhaust valve is disposed on an outside of said front muffler body.

2. The exhaust device for an internal combustion engine according to claim 1, wherein:
said exhaust muffler has a front end connected to the downstream end of said exhaust pipe;
said exhaust passage pipe has an upstream end positioned upstream of said exhaust valve and connected to said exhaust pipe in said exhaust muffler; and
said exhaust passage pipe has through holes defined therein between an area where said front end of said exhaust muffler is connected and an area where said exhaust valve is provided, said through holes being held in fluid communication with said expansion chamber.

3. The exhaust device for an internal combustion engine according to claim 1, wherein:
at least either upstream portions or downstream portions of said front muffler body and said front exhaust passage pipe are integrally connected to each other respectively by annular plate members; and
said annular plate members have fluid communication holes defined therein through which exhaust gases flow.

4. The exhaust device for an internal combustion engine according to claim 3, wherein said fluid communication holes defined in said annular plate members are provided as a plurality of fluid communication holes spaced at circumferential intervals.

5. The exhaust device for an internal combustion engine according to claim 4, wherein said fluid communication holes defined in said annular plate members are provided such that the number of the fluid communication holes defined in the annular plate member disposed on an upstream side is larger than the number of the fluid communication holes defined in the annular plate member disposed on a downstream side.

6. The exhaust device for an internal combustion engine according to claim 3, wherein said exhaust pipe has a downstream end fitted over or in and held by a front end of said exhaust passage pipe, and only said annular plate member is disposed downstream of said exhaust valve.

7. The exhaust device for an internal combustion engine according to claim 6, wherein:
said annular plate member includes radial extensions separating adjacent ones of said fluid communication holes and disposed radially; and
one of said radial extensions is positioned in overlapping relation to an exhaust valve shaft of said exhaust valve in the direction of a flow passage.

8. The exhaust device for an internal combustion engine according to claim 1, wherein:
one of said expansion chambers is provided between said front exhaust passage pipe and said front muffler body;
others of said expansion chambers are provided between said rear exhaust passage pipe and said rear muffler body;
said front muffler body has an outside diameter smaller than an outside diameter of said rear muffler body and has a constricted shape; and
said front exhaust passage pipe and said rear exhaust passage pipe are generally of the same diameter as each other.

9. The exhaust device for an internal combustion engine according to claim 1, wherein:
said exhaust muffler has a front end connected to the downstream end of said exhaust pipe;
said exhaust passage pipe has an upstream end positioned upstream of said exhaust valve and connected to said exhaust pipe in said exhaust muffler; and said exhaust passage pipe has fluid communication holes defined therein between an area where said front end of said exhaust muffler is connected and an area where said exhaust valve is provided, said through holes being held in fluid communication with said expansion chamber.

10. The exhaust device for an internal combustion engine according to claim 2, wherein:
at least either upstream portions or downstream portions of said front muffler body and said front exhaust passage pipe are integrally connected to each other respectively by annular plate members; and
said annular plate members have fluid communication holes defined therein through which exhaust gases flow.

11. The exhaust device for an internal combustion engine according to claim 1, wherein:
said exhaust muffler includes an exhaust device mount member by which said exhaust device is mounted on the vehicle;
said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
a vehicle mount to be mounted on said vehicle is provided on a junction between said front mount piece and said rear mount piece.

12. The exhaust device for an internal combustion engine according to claim 2, wherein:
said exhaust muffler includes an exhaust device mount member by which said exhaust device is mounted on the vehicle;
said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
a vehicle mount to be mounted on said vehicle is provided on a junction between said front mount piece and said rear mount piece.

13. The exhaust device for an internal combustion engine according to claim 3, wherein:
said exhaust muffler includes an exhaust device mount member by which said exhaust device is mounted on the vehicle;
said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
a vehicle mount to be mounted on said vehicle is provided on a junction between said front mount piece and said rear mount piece.

14. The exhaust device for an internal combustion engine according to claim 4, wherein:
said exhaust muffler includes an exhaust device mount member by which said exhaust device is mounted on the vehicle;
said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
a vehicle mount to be mounted on said vehicle is provided on a junction between said front mount piece and said rear mount piece.

15. An exhaust device for an internal combustion engine, comprising:
an exhaust pipe; and
an exhaust muffler connected to a downstream end of said exhaust pipe, said exhaust muffler extending from a portion thereof connected to said exhaust pipe rearward on a vehicle on which said exhaust muffler is installed;
a plurality of expansion chambers defined in said exhaust muffler;
an exhaust passage pipe extending through said expansion chambers for allowing exhaust gases from said exhaust pipe to flow therethrough; and
an exhaust valve provided in said exhaust passage pipe for opening and closing said exhaust passage pipe to switch between flow passageways for exhaust gases,
wherein said exhaust muffler is made up of a plurality of layers including said exhaust passage pipe and said expansion chambers provided around an outer periphery of said exhaust passage pipe,
wherein said exhaust muffler includes a front assembly connected to said exhaust pipe and a rear assembly connected to a rear portion of said front assembly and sub-assembled separately from said front assembly,
wherein said exhaust passage pipe includes a front exhaust passage pipe as part of said front assembly, with said exhaust valve being disposed in said front exhaust passage pipe, and a rear exhaust passage pipe as part of said rear assembly,
wherein said front assembly includes said front exhaust passage pipe, a front muffler body disposed in covering relation to an outside of said front exhaust passage pipe to cooperate with said front exhaust passage pipe in making up double-walled pipes, and said exhaust valve,
wherein said rear assembly includes said rear exhaust passage pipe and a rear muffler body disposed in covering relation to an outside of said rear exhaust passage pipe to cooperate with said rear exhaust passage pipe in making up double-walled pipes, and said front exhaust passage pipe connected to the downstream end of said exhaust pipe,
wherein one of said expansion chambers is provided between said front exhaust passage pipe and said front muffler body;
wherein others of said expansion chambers are provided between said rear exhaust passage pipe and said rear muffler body;
wherein said front muffler body has an outside diameter smaller than an outside diameter of said rear muffler body and has a constricted shape; and
wherein said front exhaust passage pipe and said rear exhaust passage pipe are generally of the same diameter as each other.

16. The exhaust device for an internal combustion engine according to claim 15, wherein:
said exhaust muffler has a front end connected to the downstream end of said exhaust pipe;
said exhaust passage pipe has an upstream end positioned upstream of said exhaust valve and connected to said exhaust pipe in said exhaust muffler; and said exhaust passage pipe has through holes defined therein between an area where said front end of said exhaust muffler is connected and an area where said exhaust valve is provided, said through holes being held in fluid communication with said expansion chamber.

17. The exhaust device for an internal combustion engine according to claim 15, wherein:
at least either upstream portions or downstream portions of said front muffler body and said front exhaust passage pipe are integrally connected to each other respectively by annular plate members; and
said annular plate members have fluid communication holes defined therein through which exhaust gases flow.

18. The exhaust device for an internal combustion engine according to claim 15, wherein:
said exhaust muffler includes an exhaust device mount member by which said exhaust device is mounted on the vehicle;
said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
a vehicle mount to be mounted on said vehicle is provided on a junction between said front mount piece and said rear mount piece.

19. An exhaust device for an internal combustion engine, comprising:
an exhaust pipe; and
an exhaust muffler connected to a downstream end of said exhaust pipe, said exhaust muffler extending from a portion thereof connected to said exhaust pipe rearward on a vehicle on which said exhaust muffler is installed;
a plurality of expansion chambers defined in said exhaust muffler;
an exhaust passage pipe extending through said expansion chambers for allowing exhaust gases from said exhaust pipe to flow therethrough; and
an exhaust valve provided in said exhaust passage pipe for opening and closing said exhaust passage pipe to switch between flow passageways for exhaust gases,
wherein said exhaust muffler is made up of a plurality of layers including said exhaust passage pipe and said expansion chambers provided around an outer periphery of said exhaust passage pipe,
wherein said exhaust muffler includes a front assembly connected to said exhaust pipe and a rear assembly connected to a rear portion of said front assembly and sub-assembled separately from said front assembly,
wherein said exhaust passage pipe includes a front exhaust passage pipe as part of said front assembly, with said exhaust valve being disposed in said front exhaust passage pipe, and a rear exhaust passage pipe as part of said rear assembly,
wherein said front assembly includes said front exhaust passage pipe, a front muffler body disposed in covering relation to an outside of said front exhaust passage pipe to cooperate with said front exhaust passage pipe in making up double-walled pipes, and said exhaust valve,
wherein said rear assembly includes said rear exhaust passage pipe and a rear muffler body disposed in covering relation to an outside of said rear exhaust passage pipe to cooperate with said rear exhaust passage pipe in making up double-walled pipes, and said front exhaust passage pipe connected to the downstream end of said exhaust pipe,
wherein said exhaust muffler includes an exhaust device mount member by which said exhaust device is mounted on the vehicle;
wherein said exhaust device mount member includes a front mount and a rear mount fixed respectively to said front muffler body and said rear muffler body, a front mount piece extending from said front mount upwardly of said front muffler body, and a rear mount piece extending from said rear mount and joining said rear mount to an upper end of said front mount piece; and
wherein a vehicle mount to be mounted on said vehicle is provided on a junction between said front mount piece and said rear mount piece.

* * * * *